United States Patent
Laroia et al.

(10) Patent No.: US 7,859,986 B2
(45) Date of Patent: Dec. 28, 2010

(54) CARRIER SEARCH METHODS AND APPARATUS

(75) Inventors: Rajiv Laroia, Basking Ridge, NJ (US); Charles Stanski, Belvidere, NJ (US); Junyi Li, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1001 days.

(21) Appl. No.: 11/153,767

(22) Filed: Jun. 14, 2005

(65) Prior Publication Data

US 2005/0250469 A1     Nov. 10, 2005

Related U.S. Application Data

(62) Division of application No. 10/964,965, filed on Oct. 14, 2004, now Pat. No. 7,092,353.

(60) Provisional application No. 60/512,468, filed on Oct. 17, 2003.

(51) Int. Cl.
     *H04J 11/00*      (2006.01)
(52) U.S. Cl. ........................... 370/208; 370/329
(58) Field of Classification Search .................. 370/343, 370/431, 480, 496, 329, 331; 455/422.1, 455/434, 450, 515, 524, 525
See application file for complete search history.

(56) References Cited

U.S. PATENT DOCUMENTS

| | | | |
|---|---|---|---|
| 5,042,050 A | * | 8/1991 | Owen .......................... 375/140 |
| 5,448,569 A | | 9/1995 | Huang et al. |
| 5,448,569 A | | 9/1995 | Huang et al. |
| 5,475,677 A | | 12/1995 | Arnold et al. |

(Continued)

FOREIGN PATENT DOCUMENTS

JP      10-256938      9/1998

(Continued)

OTHER PUBLICATIONS

International Search Report and Written Opinion of the International Searching Authority. PCT/US/04/33894, pp. 1-11. Feb. 2, 2006.

(Continued)

*Primary Examiner*—Derrick W Ferris
*Assistant Examiner*—Jose Villa
(74) *Attorney, Agent, or Firm*—James K. O'Hare

(57) ABSTRACT

Transmitting signals, e.g., high power narrow band signals on a periodic basis to facilitate detection of a frequency band and/or carrier signal to be used for communication with a basestation are described. The detected frequency band may be a downlink frequency band. The uplink frequency band to be used can be determined from a know frequency relationship between the detected downlink carrier and a corresponding uplink carrier or by monitoring the detected downlink frequency band for information indicating the uplink frequency band/carrier to be used. Carrier search methods involving searching for the narrowband high power signals used to provide carrier information and/or to indicate the frequency band to be monitored are described. Power detection methods can be used to detect the high power signals avoiding the need for symbol timing synchronization and/or channel estimation with regard to detection of the signals used to locate the frequency band to be used.

28 Claims, 12 Drawing Sheets

U.S. PATENT DOCUMENTS

| | | | |
|---|---|---|---|
| 5,491,837 A * | 2/1996 | Haartsen ..................... 455/62 |
| 5,493,563 A | 2/1996 | Rozanski et al. |
| 5,513,379 A | 4/1996 | Benveniste et al. |
| 5,844,939 A | 12/1998 | Scherer et al. |
| 5,909,433 A | 6/1999 | Haartsen |
| 5,914,933 A | 6/1999 | Cimini et al. |
| 5,936,570 A | 8/1999 | Ghazvinian et al. |
| 6,052,594 A * | 4/2000 | Chuang et al. ............. 455/450 |
| 6,131,016 A | 10/2000 | Greenstein et al. |
| 6,151,512 A | 11/2000 | Chheda et al. |
| 6,256,334 B1 * | 7/2001 | Adachi ..................... 375/132 |
| 6,359,867 B1 | 3/2002 | Ali-Vehmas |
| 6,389,087 B1 * | 5/2002 | Heinonen et al. ........... 375/354 |
| 6,411,644 B1 | 6/2002 | Myer |
| 6,466,606 B1 * | 10/2002 | Jou ........................... 375/130 |
| 6,522,881 B1 * | 2/2003 | Feder et al. ................ 455/437 |
| 6,636,738 B1 * | 10/2003 | Hayashi ..................... 455/450 |
| 6,768,714 B1 * | 7/2004 | Heinonen et al. ........... 370/208 |
| 6,771,622 B1 * | 8/2004 | Banerjee ..................... 370/331 |
| 6,795,489 B2 * | 9/2004 | Joshi et al. .................. 375/149 |
| 7,092,353 B2 * | 8/2006 | Laroia et al. ................ 370/210 |
| 7,313,398 B1 * | 12/2007 | Ramahi ....................... 455/436 |
| 2001/0055297 A1 * | 12/2001 | Benveniste .................. 370/349 |
| 2003/0091006 A1 | 5/2003 | Peltola |
| 2004/0095902 A1 | 5/2004 | Laroia et al. |
| 2004/0109432 A1 | 6/2004 | Laroia et al. |
| 2004/0224687 A1 | 11/2004 | Rajkotia |
| 2005/0085214 A1 * | 4/2005 | Laroia et al. ................ 455/403 |
| 2005/0250469 A1 * | 11/2005 | Laroia et al. ................ 455/403 |

FOREIGN PATENT DOCUMENTS

| | | |
|---|---|---|
| JP | 2003-259434 | 9/2003 |
| JP | 2004-530319 | 9/2004 |
| JP | 2005-525725 | 8/2005 |

OTHER PUBLICATIONS

International Preliminary Report on Patentability PCT/US04/33894, pp. 1-6. Apr. 27, 2006.

* cited by examiner

CARRIER SEARCH METHODS AND APPARATUS

RELATED APPLICATIONS

The present application is a divisional of U.S. patent application Ser. No. 10/964,965, filed on Oct. 14, 2004 now U.S. Pat. No. 7,092,353 and titled "CARRIER SEARCH METHODS AND APPARATUS", which claims the benefit of U.S. Provisional Patent Application Ser. No. 60/512,468 filed Oct. 17, 2003 which is hereby expressly incorporated by reference.

FIELD OF THE INVENTION

The present invention relates to communications systems and, more particularly, to methods and apparatus for facilitating and/or performing a carrier search.

BACKGROUND

Various service providers have been acquiring frequency spectrum in various frequency bands based on the availability of wireless communication spectrum in various, relatively limited, geographic regions. A goal of at least some of these service providers is to create a relatively large network by providing service using the available frequency bands which can be acquired from region to region.

Multichannel Multipoint Distribution System (MMDS) band, is a title sometimes used to describe an unconventional band formed by a plurality of different frequency bands in different geographic regions. MMDS enables opportunities for service providers who own the rights to different frequency spectrum in different geographic locations. The MMDS band is unconventional in that a service provider may be assigned different frequency bands in different geographic regions, e.g., cities or states. It is also unconventional in that the carrier frequency to be used may be different in different geographic areas and may be determined by the particular service provider in the region. Thus, there is no single primary carrier, which is known throughout a wide area, e.g., the entire country, to which a mobile can initially tune upon entering a service area to obtain additional carrier and/or band allocation information.

Service providers may deploy the system in different carriers in different areas, depending on spectrum availability. Wireless terminals, which may operate in any number of different areas, have to search and find the available carrier upon entering an area in order to obtain services using the MMDS band. In addition, in FDD (Frequency Division Duplex) systems, the pairing of downlink and uplink carrier frequencies may not be fixed throughout a wide area, e.g., different carriers used for downlink signaling may be associated with different carriers used for uplink signaling in different geographic areas.

It should be appreciated from the above discussion, that the use of different frequency bands and/or carriers in different locations can greatly complicate the task confronting a wireless terminal regarding what frequency band and/or carrier frequency (or frequencies) should be used in a particular geographic region.

Accordingly, there is a need for apparatus and methods that will enable a wireless terminal to quickly and efficiently search and find the carrier frequency or frequencies and/or the frequency band to be used for communications purposes in a particular geographic region.

SUMMARY

The present invention is directed to methods and apparatus that can be used to facilitate detection of one or more carriers and/or a frequency band to be used by a wireless terminal, e.g., when communicating with a base station or other device in one or more geographic regions. Various embodiments of the present invention use beacon signaling to facilitate detection and selection of the carriers and/or frequency band to be used. The method and apparatus of the present invention can be used in system, which includes cells with single or multiple sectors per cell.

In accordance with the present invention, different base stations may use different carrier frequencies for uplink and/or downlink signaling. A frequency band used for communicating information, e.g., user data and/or control signals, is associated with each carrier frequency. Each frequency band may be divided into a number of different tones for communications purposes with the different tones corresponding to different frequencies.

In accordance with the invention, each base station in the system periodically transmits one or more high power signals, referred to herein as beacon signals, on a periodic basis to facilitate detection of a frequency band and/or carrier signal to be used for communication with the base station transmitting the beacon signals.

In some systems using the invention, base station transmitters in different sectors and/or cells periodically transmit a high power signal, sometimes called a beacon signal, into its own downlink frequency band. Beacon signals are signals which include normally one, but sometimes a few, narrow (in terms of frequency) signal components, e.g., signal tones, which are transmitted at relatively high power compared to other signals such as user data signals. In some embodiments beacon signals each include one or more signal components where each signal component corresponds to a different tone. A beacon signal component in some embodiments includes a per tone signal energy which is 10, 20, 30 or more times the average per tone signal energy of signal tones used to transmit user data and/or non-beacon control signals. In the case of a single tone beacon signal, the frequency of the beacon signal is readily determined from the frequency of the single high power tone which makes up the beacon signal.

In the case where more than one high power tone is used as a beacon signal, for purposes of the present application, the frequency of the beacon signal is a frequency determined according to a predetermined frequency definition. This definition is fixed for a given implementation and is therefore predictable in terms of how the beacon signal will be interpreted. In many embodiments, the frequency of a beacon signal with multiple tones is predefined to be the frequency of one of the tones in the beacon signal, e.g., the frequency of the lowest or highest tone that is included in the beacon signal. In other embodiments, the frequency of the beacon signal is defined to be based on the frequency of at least one high power tone in the beacon signal but may be determined to be a value which is a combination of the frequency of multiple high power tones. While the manner in which the frequency of a beacon signal is determined may vary, the use of a consistent definition of the frequency of each beacon signal of a particular type in a particular application enables proper interpretation of the beacon signal information.

Given that carrier beacon signals are usually implemented as single tone beacon signals, the concepts of the present invention will be described primarily in the context of single tone beacon signal implementations. However, it should be appreciated that the methods and apparatus of the present invention are not limited to such exemplary implementations.

Different types of beacon signals may be transmitted to convey different types of base station related information. The information can be conveyed by the frequency of the tone or tones used to transmit a beacon signal and/or from the frequency of multiple beacons when beacon signals are detected over a period of time. The pattern of beacons which are transmitted may be fixed and known to the wireless terminals in the system which can use this information to interpret the meaning of received beacon signals. For example, carrier beacons may be transmitted a fixed frequency distance from the edge of a downlink frequency band.

At least one signal component, e.g., tone, of a beacon signals used to convey carrier information is often positioned at a fixed tone location relative to the highest or lowest tone used by the transmitter for downlink communications. In some embodiments, this single tone used to convey carrier information is the highest power tone of any of the transmitted beacon signals. However, this is not a mandatory requirement. While the beacon signal tone used to transmit carrier information is normally fixed in terms of frequency, in some embodiments the tone used for the carrier beacon may hop, e.g., change, according to a hopping pattern known to both the transmitting base station and the wireless terminals in the system. Carrier beacon signals, are often but not always implemented as single tone signals that are usually transmitted at a fixed tone location within the frequency band to be used for downlink communications purposes. However, other types of beacons, e.g., cell identifier and/or sector identifier beacons may, and often do hop within the frequency band used for downlink communications purposes according to a known hopping sequence. Carrier beacons, in many embodiments, are transmitted at a lower rate (e.g., are less frequent) than other types of beacon signals, such as cell or sector identifier beacon signals.

Systems implementing the beacon transmission methods of the present invention normally include multiple cells, e.g., at least a first and a second cell. The first and second cells will often use different carries and thus different frequency bands depending on the geographic region in which they are located. While both cells will transmit beacon signals in accordance with the invention, the timing of the transmission of the signals need not be time aligned and, in most cases, the cells will be unsynchronized with regard to symbol transmission timing. In one such exemplary embodiment, a first base station sector transmitter in the first cell will transmit using a first frequency band during a first time period, e.g., an ultra slot, which will include many smaller, e.g., second time period, slots. In each of the second time period slots, e.g., beacon slots, at least one beacon signal is transmitted in the first frequency band. The type of beacon signal can vary depending on the place within the ultra slot at which it is transmitted. During the larger time slot, e.g., the ultra slot, at least one carrier beacon is transmitted and, in the exemplary embodiment multiple cell identifier and sector identifier beacons signals are transmitted. In the exemplary embodiment, the second cell includes a second base station transmitter that transmits using a second frequency band which is different than the first frequency during a third time period, e.g., an ultra slot which occurs in the second cell. The third time period includes many smaller, e.g., fourth time period, slots. In each of the fourth time period slots, e.g., beacon slots in the second cell, at least one beacon signal is transmitted. During the larger time slot, e.g., the ultra slot in the second cell, at least one carrier beacon is transmitted within the downlink frequency band used in the second cell and, in the exemplary embodiment multiple cell identifier and sector identifier beacons signals are transmitted in the downlink frequency band that is used. Since different frequency bands are used in the first and second cells, the carrier beacons will be transmitted at different frequencies, e.g., using tones located at a fixed offset in terms of frequency from one of the ends of the utilized frequency band.

In some particular embodiments, to facilitate identification of carrier beacons, e.g., carrier beacon tones, they are transmitted as the lowest or highest tone used to transmit a beacon signal with a sector or cell. When this optional feature is used, combined with the optional feature of not hopping the carrier beacon signal while hopping other beacon signals used in the cell, the carrier beacon becomes relatively easy to identify. In some embodiments, the carrier beacon is the only fixed tone beacon which is used in the cell with all other beacon types being hopped. However, this is not a limitation of all embodiments.

In some embodiments, the carrier frequency and corresponding communications band to be used for uplink signaling has a fixed relationship, e.g., has a known frequency difference, from the downlink carrier frequency which can be detected in accordance with the invention. When there is such a fixed relationship, wireless terminals can store the frequency relationship information. Using the stored information and information determined from received beacon signals about the downlink carrier frequency, wireless terminals can determine the uplink carrier frequency and/or carrier band once the downlink carrier frequency and/or band has been identified. In other embodiments, after determining the downlink frequency band to use, the wireless terminal monitors the downlink frequency band for broadcast information indicating which uplink carrier and/or frequency band to use. This information may be communicated as an offset from the downlink carrier or an explicit message indicating the carrier frequency and/or width of the uplink frequency band to be used in communicating with the base station which transmitted the detected carrier beacon signal.

Various carrier detection techniques which take advantage of the novel beacon transmission methods, and the fact that they will be transmitted in a downlink in a predictable manner that allows a receiver to determine the location and/or width of a frequency band to be used are discussed in detail in the description which follows. The detection techniques involve searching a frequency band for a beacon signal, adjusting the frequency band being examined following detection of a beacon signal and continuing to monitor for a second beacon signal. Based on the frequency of one or both of the detected beacon signals, the carrier frequency and/or frequency band used for downlink communications signaling is determined.

Notably, the use of beacon signals allows a receiver to detect, using energy detection techniques applied to received beacon signals, which carrier frequency should be used and the location of a communications band corresponding to the carrier to be used, without a wireless terminal having to achieve symbol timing or carrier frequency synchronization with a base station transmitting the beacon signals and without having to have already generated a channel estimate of the channel through which the beacon signals were transmitted to the wireless terminal. Thus, the frequency band to be used for downlink signaling can be determined in many cases before OFDM symbols requiring symbol timing synchronization to decode can be decoded and interpreted.

The methods and apparatus are well suited to use in OFDM communications systems as well as other types of communications systems. In OFDM systems multiple modulated symbols are often transmitted by a transmitter in parallel during each OFDM symbol transmission time period. In some embodiments, each beacon slot includes over ten, e.g., 16 or more, OFDM symbol transmission time periods. In some embodiments, each ultra slot includes multiple beacon slots. In some implementations each ultra slot includes a very large number of symbol transmission time periods, e.g., over 1,000 and, in some embodiments, over 10,000 symbol transmission time periods. The number of tones and the bandwidth used for uplink and downlink signaling can be different in different system implementations and within different cells or sectors of a system. In one particular exemplary embodiment the number of tones used for downlink signaling exceeds 100 tones. The spacing between frequency bands used for uplink and downlink signaling may be as little as the frequency spacing between tones used for downlink signaling but in some embodiments the uplink and downlink frequency bands are separated by many tones. In such embodiments, knowledge about the location of the uplink carrier to be used relative to the downlink carrier can be important to determining the appropriate uplink carrier to be used. As discussed above, depending on the particular embodiment, uplink carrier information relative to a particular downlink carrier or frequency band can be pre-stored where the relationship is fixed throughout a system or region or can be obtained from signals transmitted over the downlink.

While different distinct frequency bands are used for uplink and downlink signaling in many embodiments, it is possible for the uplink and downlink signaling bands to overlap, e.g., with the tones in the uplink and downlink bands being interleaved according to a known pattern.

Numerous variations on the methods and apparatus of the present invention are possible. While many of the features of the invention have been discussed, additional features, benefits and exemplary embodiments of the methods and apparatus of the present invention are provided in the detailed description which follows.

DETAILED DESCRIPTION OF THE INVENTION

The present invention is directed to methods and apparatus that can be used to facilitate detection of one or more carriers and/or a frequency band to be used by a wireless terminal, e.g., when communicating with a base station or other device in one or more geographic regions. Various embodiments of the present invention use beacon signaling to facilitate detection and selection of the carriers and/or frequency band to be used. In the context of the present application, beacons are signals which include one or more relatively high power narrowband signals transmitted at the same time. Each narrowband signal in a beacon signal may correspond to a single tone. The beacon signals are normally transmitted using more power than is used to transmit data signals, e.g., 2, 5, 20, 100 or even more times as much power as the highest power data signals.

The methods and apparatus of the present invention can be applied to a wide variety of communications systems but are particularly well suited for use in frequency division multiplexed systems such as orthogonal frequency division multiplexed systems.

The method and apparatus of the present invention will be described in the exemplary context of an orthogonal frequency division multiplexing (OFDM) system that uses beacon signals to support a relatively low complexity, efficient, and/or robust method to find carriers in accordance with the invention. As noted above, a beacon signal is a high power signal, usually considerably more powerful than any single pilot or data signal having the same bandwidth of the beacon signal. In fact, beacon signals are often many times more powerful from a standard pilot or data tone making them relatively easy to detect. Since beacons usually occupy very little bandwidth, e.g., a single tone, the frequency of a beacon signal (tone) is also relatively easy to determine. In the case of beacon signals with multiple tones, in some embodiments of the invention the frequency of one of the beacon signal tones, e.g., the beacon signal tone having the highest or lowest frequency in the beacon signal, is used as the frequency of the beacon signal and, in some cases, this tone that is used to determine the frequency of the beacon signal is transmitted with more power than the other tones in beacon signal. However, other approaches to determining the transmission frequency of the beacon signal tone can be used so long as the approach is consistent when implementing the methods of the invention. Beacon signals usually have a short duration, occupying one OFDM symbol transmission time period in one exemplary OFDM embodiment. Beacon signals are generally transmitted relatively infrequently in comparison to normal data and control signaling.

Figure 1:
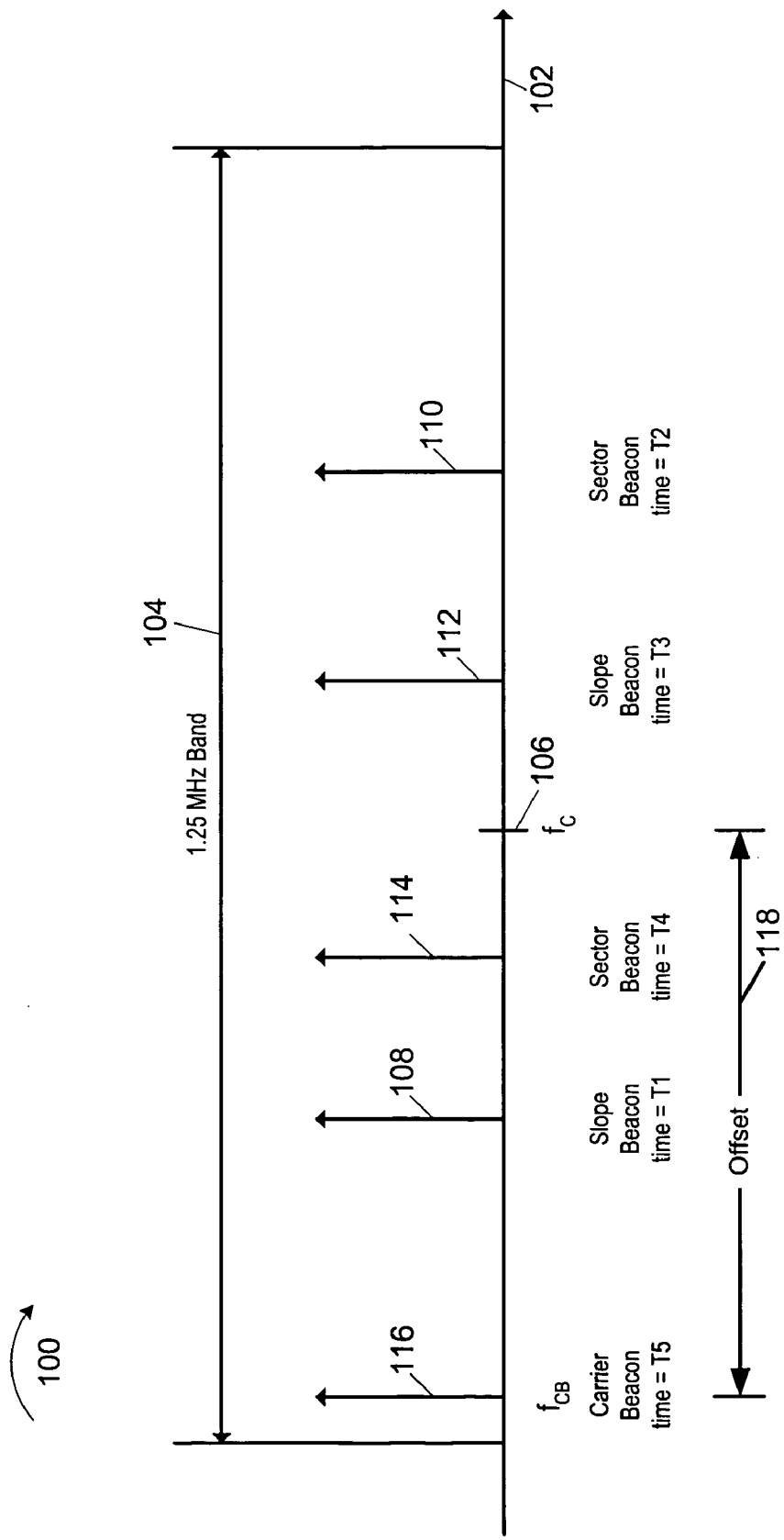
FIG. 1 is a drawing of exemplary beacon signaling that may be used within a service band, in accordance with the present invention.

FIG. 1 shows a drawing 100 illustrating exemplary beacon signaling that may be used within a service band. A service band is the bandwidth of which the system of interest is deployed. For example, some service bands are 1.25 MHz while others are 5 MHz. Horizontal axis 102 represents frequency. Range 104 represents a service band of 1.25 MHz. A carrier frequency is represented as $f_c$ 106, and is often, though not necessarily, centered within the service band 104. The beacon signals are transmitted from a base station on a downlink broadcast channel, e.g., each beacon signal is a single tone in a single OFDM symbol with all or most of the sector transmission power concentrated on the beacon signal tone. Beacon signals are transmitted periodically, e.g., once every 90 msec. Different types of beacons signals, e.g., slope beacons, sector beacons, and carrier beacons may be transmitted at different times. Note that slope is a cell identifier. In some embodiments, the location, in the frequency domain, of the slope and sector beacons may change (hop) over time, while the location of the carrier beacon, in the frequency domain, is at a fixed location relative to the carrier. FIG. 1 shows a first slope beacon 108 occurring at time T1, a first sector beacon 110 occurring at time T2, a second slope beacon 112 occurring at time T3, a second sector beacon 114 occurring at time T4, and a carrier beacon 116 occurring at time T5. Note that the frequency of the slope beacons 108, 112 and sector beacons 110, 114 are not fixed and change overtime, while the location of the carrier beacon 116 is fixed at $f_{CB}$, and a fixed offset 118 exists with respect to the carrier frequency $f_c$ 106. In some embodiments, carrier type beacons 116 are transmitted less frequently in time than slope and sector type beacons, e.g., one carrier beacon 106 is transmitted for every 16 beacon slots.

Figure 2:
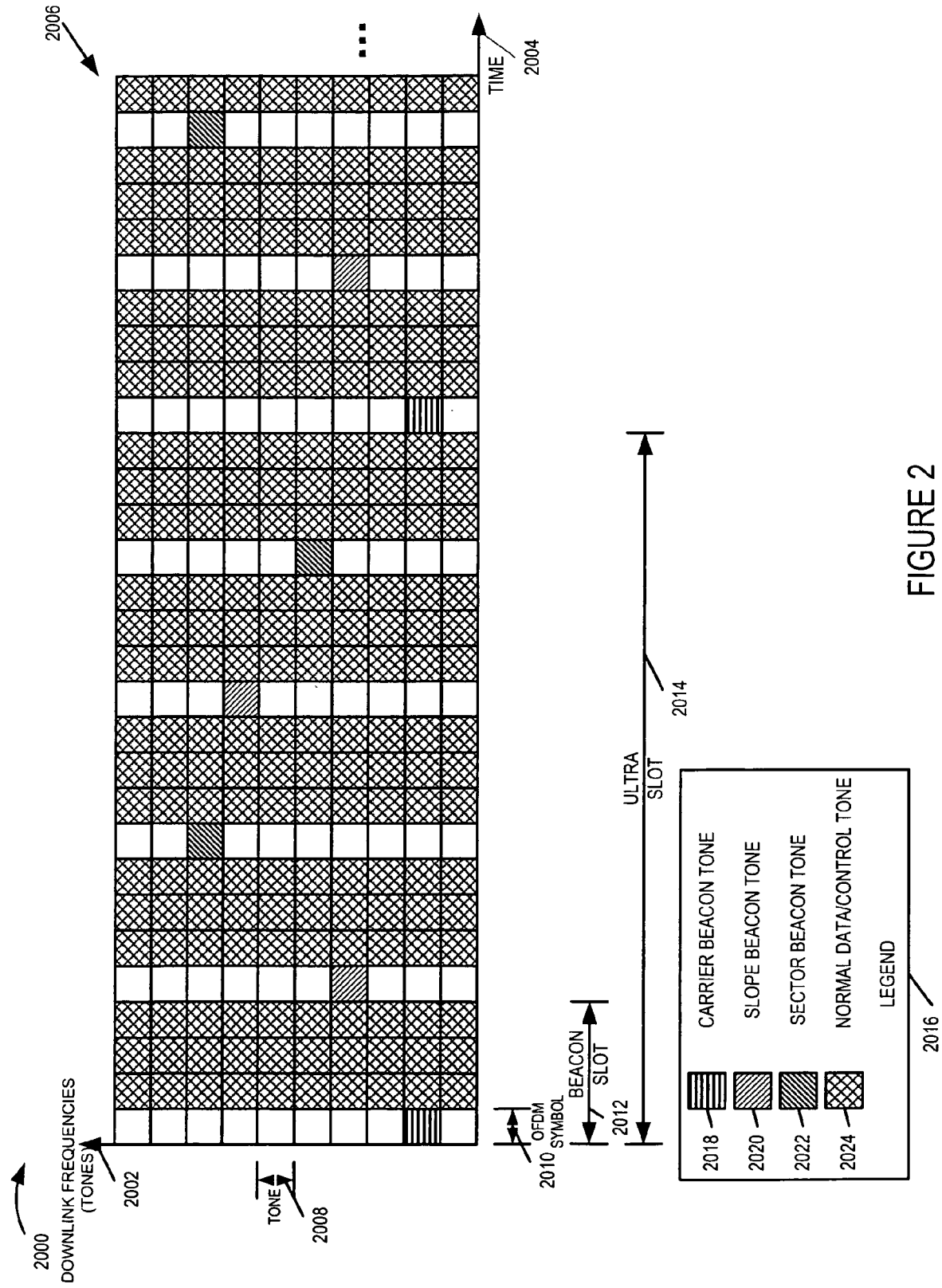
FIG. 2 is a drawing illustrating another exemplary embodiment of beacon signaling, in accordance with the present invention, and the signaling of FIG. 2 is shown in a time frequency grid.

FIG. 2 provides an illustration 2000 for another similar exemplary embodiment of beacon signaling; the illustration of FIG. 2 is shown in a time-frequency grid. In FIG. 2, the horizontal axis 2004 represents time and the vertical axis 2002 represents downlink frequencies or tones. Each division of the vertical axis represents one tone 2008, while each division of the horizontal axis represents one OFDM symbol 2010. Each small box in this figure represents a single tone in an OFDM-symbol which is sometimes referred to as a tone-symbol. Grid 2006 shows 10 tones 2008 over 30 OFDM-symbols 2010 or 300 tone-symbols. Each tone-symbol can be used to convey a beacon signal, normal/control data, or be left unused. Legend 2016 identifies carrier beacon tones 2018 by horizontal line shading, slope beacon tones 2020 by diagonal line shading slanting downward from left to right, sector beacon tones 2022 by diagonal line shading slanting upward from left to right, and normal data/control tones 2024 by crosshatch shading. Small boxes in grid 2006 which are left unshaded represent tones during OFDM symbols which are left unused. In the example of FIG. 2, a beacon signal is a special OFDM-symbol in which almost all the downlink transmission power is concentrated on a single tone, while nearly zero power is used in all the other tones. In one embodiment, the beacon signals are transmitted periodically such that the time interval between any two successive beacon signals is a constant, which is called as a beacon slot. Thus, in a beacon slot there is one beacon signal. FIG. 2 shows an exemplary beacon slot 2012 including 4 successive OFDM symbols; one OFDM symbol is used for the beacon signal and 3 OFDM symbols are used to convey data/control signaling. FIG. 2 further shows that the frequency tone locations of different beacon signals are different. In the example of FIG. 2, the tone location of the carrier beacon tone remains fixed while the tone location of the slope and sector beacon tones hop over time; the carrier beacon tone is at lower frequency than any of the slope or sector beacon tones. In FIG. 2, the carrier beacon is transmitted less frequently than the slope and sector beacons; one carrier beacon is transmitted for every two slope beacons and two sector beacons. The pattern of beacon tones repeats on a larger time interval, referred to as an ultra slot. In the example of FIG. 2, one carrier beacon occurs per ultra slot and the ultra slot includes 5 beacon slots.

FIG. 2 is presented for the purpose of illustrating various concepts and features of the present invention. One exemplary embodiment, in accordance with the present invention, may include: 113 downlink tones, a beacon signal for 1 out of 904 OFDM symbols, a beacon slot of 90 msec duration, an ultra slot spanning 16 beacon slots or 1.44 sec, one carrier beacon at a fixed tone location per ultra slot, and 15 slope/sector beacons per ultra slot. Some exemplary embodiments may include 25 beacon slots per ultra slot.

Note that within a service band, in some embodiments, the frequency tone of a carrier beacon is lower than that of any of slope or sector beacon. As will be clear later, this tone arrangement helps to search for carrier beacon signals. It can be seen that the same benefit can be obtained if the frequency tone of a carrier beacon is higher than that of any of slope or sector beacon.

Figure 3:
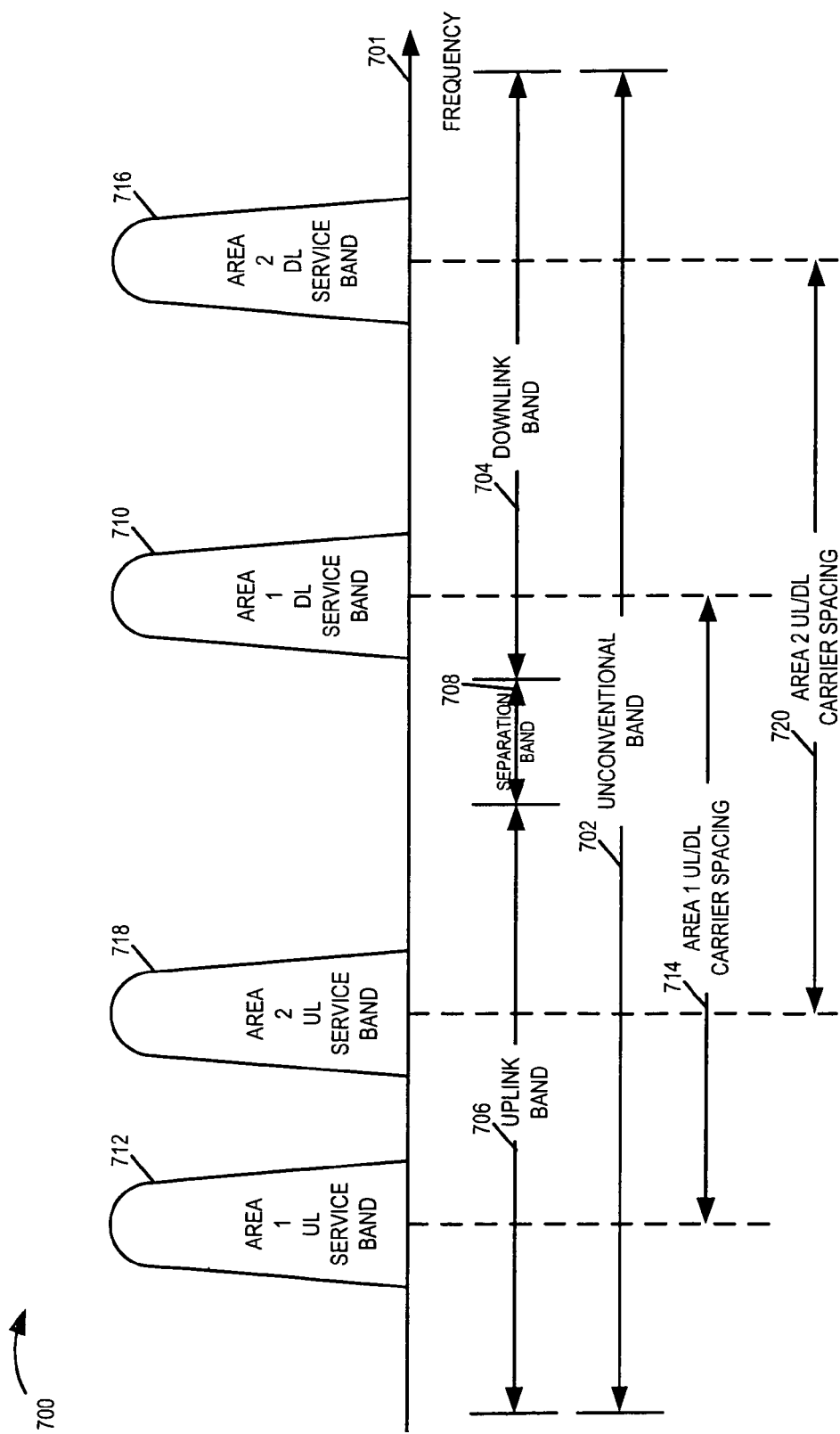
FIG. 3 shows an exemplary carrier deployment situation of deploying different service bands in an unconventional band in different areas.

FIG. 3 is a drawing 700 showing an exemplary carrier deployment situation of deploying different services bands in an unconventional band in different areas. Horizontal axis 701 represents frequency. In FIG. 3, the unconventional band 702 has 50 MHz bandwidth in total. In a FDD system, the 50 MHz is partitioned to include two bands (704, 706), one band 704 used for the downlink and the other band 706 used for the uplink. The unconventional band 702 also includes a separation band 708 between the downlink and uplink bands (704, 706). In some embodiments, the unconventional band 702 is partitioned into a downlink and uplink band and does not include a separation band. FIG. 3 also shows that a service provider has 1.25 MHz service band in both downlink and uplink. However, the downlink and uplink service bands are different in different geographic areas and the spacing between the downlink and uplink carriers also varies. In one area, the service provider has downlink band 710 and uplink band 712 with carrier spacing 714, while in another area the service provider has downlink band 716 and uplink band 718 with carrier spacing 720.

As the wireless terminal does not know the location of downlink and uplink service bands, it has to carry out a carrier search procedure. The carrier search procedure includes two general steps. In the first step, the wireless terminal quickly scans possible service bands to detect the existence of beacon signals by checking the received energy in the downlink signal. After a beacon signal has been detected, in the second step, the wireless terminal then searches for a carrier beacon signal to identify the carrier location.

In either step, to detect beacon signals, the wireless terminal sets a search frequency and monitors the downlink signal of a search band centered at the search frequency. In one embodiment, the search band has the same bandwidth as the service band, e.g., 1.25 MHz. The advantage is that the wireless terminal can use the same hardware device, such as RF filters, for the carrier search procedure and for normal service.

Note that for a given search frequency carrier, the corresponding search band may not overlap, partially overlap, or completely overlap with the service band. If the search band does not overlap with the service band, then the wireless terminal will not detect any beacon signal in any time interval of a beacon slot. If the search band completely overlaps with the service band, then the wireless terminal will detect a beacon signal in any time interval of a beacon slot. If the search band partially overlaps with the service band, then the wireless terminal may or may not detect any beacon signal in any time interval of a beacon slot.

Figure 4:
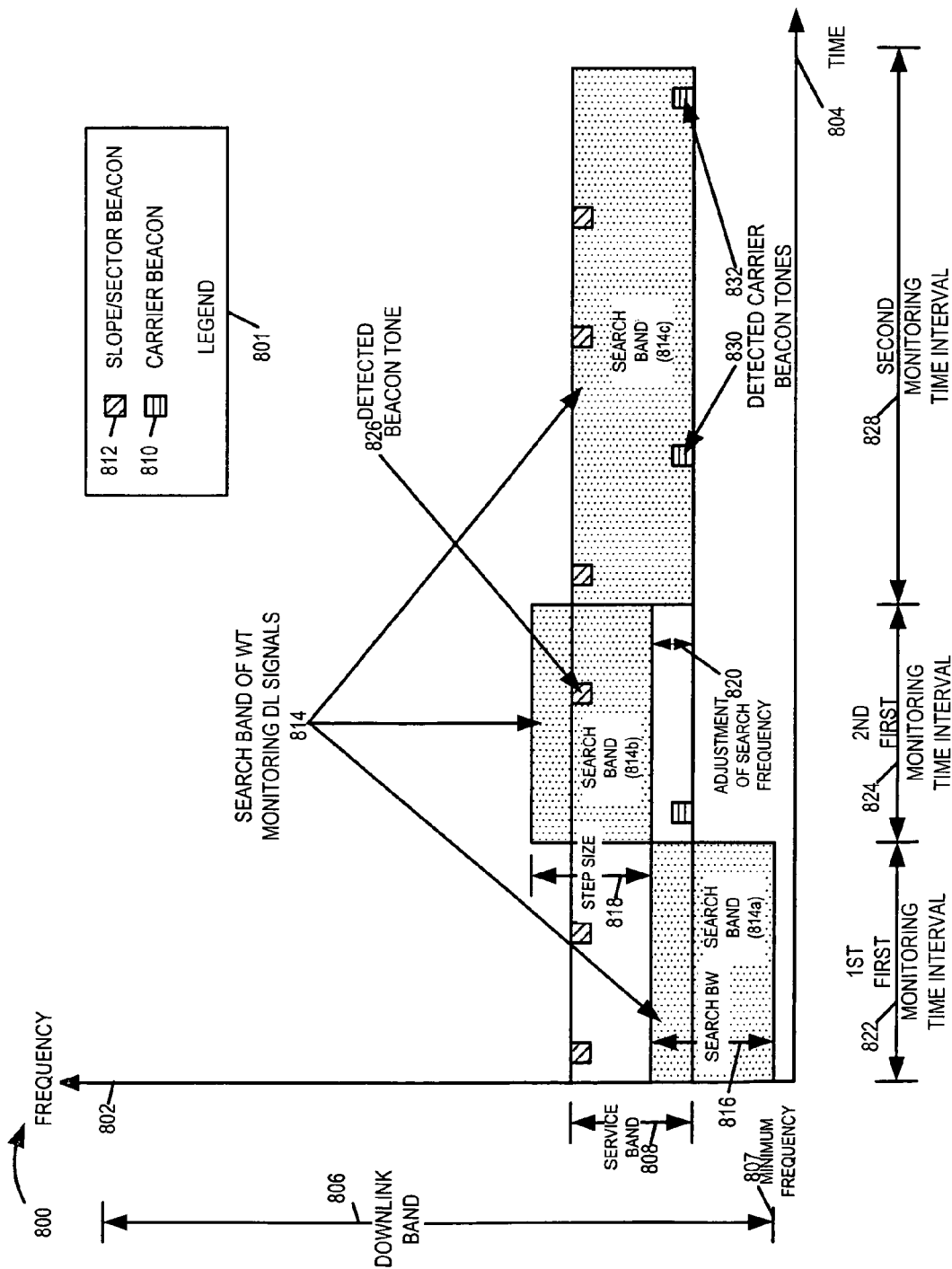
FIG. 4 is a drawing showing an exemplary carrier search method, in accordance with the present invention.

FIG. 4 is a drawing 800 showing an exemplary carrier search method, in accordance with the present invention. FIG. 4 includes a plot of frequency on the vertical axis 802 vs time on the horizontal axis 804. FIG. 4 also includes a downlink band 806. Downlink band 806 includes a minimum frequency 807 and a plurality of service bands including a service band 808 for the area in which the WT is currently located. The service band 808 includes beacon signals transmitted periodically including carrier beacons and slope/sector beacons; the slope/sector type beacons being transmitted more frequently than the carrier type beacons. Legend 801 includes an exemplary carrier type beacon 810 illustrated by a small square with horizontal line shading and an exemplary slope/sector type beacon 812 illustrated by a small square with diagonal line shading. This shading representation of legend 801 is used in the beacons of the service band 808. The carrier beacon 810 being the lowest frequency beacon of the beacon types in the service band 808. FIG. 4 also includes a search band 814 including a search band bandwidth 816. The search band bandwidth 816 is the same size as the service band bandwidth. The search band 814, in terms of frequencies searched, moves during the search process and is represented as search band 814*a*, 814*b*, 814*c* at different times. Step size 818 is the amount the search band 814 is moved if a beacon is not found during a first monitoring interval of time. Adjustment of the search frequency 820 is the amount the search band 814 is moved based on a detected beacon during a first monitoring time interval. Adjustment amount 820 may vary as a function of the location of the detected beacon within the search band 814. Drawing 800 includes two successive first monitoring time intervals (822, 824); no beacons being detected during the 1st first monitoring time interval 822, and one beacon 826 being detected during the 2nd first monitoring time interval 824. Subsequent to the 2nd first monitoring interval 824 is a second monitoring time interval 828, longer in duration than the first monitoring interval and including two successive detected carrier beacons 830, 832.

The exemplary carrier search method will now be described. The wireless terminal starts the first step by setting the search frequency such that the search band 814 covers the low end of the downlink band 806 as represented by 814*a*. The wireless terminal monitors the downlink signal of the search band 814*a* for a first monitoring time interval 822, which is in the order of a small number of beacon slots. For example, the first monitoring time interval is set to be slightly longer than the beacon slot, e.g., the duration of two beacon slots. For example, in the case where the beacon slot is 90 msec, the first monitoring interval may be set to 180 msec.

If the wireless terminal does not detect any beacon signal within the 1st first monitoring time interval 822, the wireless terminal concludes that the search band 814*a* does not overlap with the service band 808. The wireless terminal then increases the search frequency by a step size 818. The step size 818 should not exceed the bandwidth size 816 of the search band 814. In the shown example, the step size 818 is equal to the size 816 of the search band 814, e.g., 1.25 MHz. In one embodiment, the step size is slightly smaller than the size of the search band, e.g., 1.00 MHz, or half of the size of the search band.

After increasing the search frequency by the step size 818, the wireless terminal sets the new search frequency and corresponding new search band 814*b*. Similarly, the wireless terminal monitors the downlink signal of the new search band 814*b* for the 2nd first monitoring time interval 824. If no beacon signal is detected, the wireless terminal will continue to increase the search frequency by the step size 818 and repeat the search procedure. If a beacon signal is found, as shown in the example, the wireless terminal proceeds to the second step.

Note that the detected beacon signal in the first step may be a carrier beacon signal or other type of beacon signal. If the search band partially overlaps with the service band, then there is a possibility that the detected beacon signal is not a carrier beacon signal and the search band may not even cover the frequency tone of the carrier beacon. This is the case of the FIG. 4 example, the detected beacon 826 is a slope/sector type beacon 812, and the search band 814*b* does not cover the tone of a carrier type beacon 810. At the beginning of the second step, the wireless terminal first adjusts the search frequency to make sure that adjusted search band 814*c* will cover the carrier beacon. For example, suppose that the carrier beacon is lower than any of slope or sector beacon in frequency, as is the case in the FIG. 4 example. Then, the wireless terminal can adjust the search frequency so that the detected beacon tone is located in the high end of the adjusted search band or in the high end of the possible beacon tone location of within any given search band. In FIG. 4 example, the wireless terminal has adjusted the search band 814 by amount 820 from search band 814*b* to search band 814*c*, which places the frequency of the detected beacon 826 near the top of the band 814*c*. Search band 814*c* includes the frequency used by the carrier beacons.

The wireless terminal proceeds to monitor the downlink signal of the adjusted search band 814*c* for a second monitoring time interval 828, which is in the order of a small number of ultra slots. For example, the second monitoring time interval is set to be slightly longer than the ultra slot. For example, in an exemplary embodiment where the ultra slot is approximately 1.44 sec, the second monitoring interval may be set to 1.5 sec. In the second monitoring time interval 828, the wireless terminal may detect multiple beacon signals. The wireless terminal should identify those beacon signals 830, 832 associated with the carrier beacon tone according to the characteristics of the carrier beacon tone. For example, in some embodiments, the carrier beacon signal repeats exactly an ultra slot. In some embodiments, the carrier beacon tone is the lowest frequency beacon tone in the service band. In some embodiments, the carrier beacon tone is the highest frequency beacon tone in the service band. In some embodiments, the carrier beacon tone is fixed, while the other types of beacons tones, e.g., slope/sector beacon tones hop frequencies over time.

Figure 5:
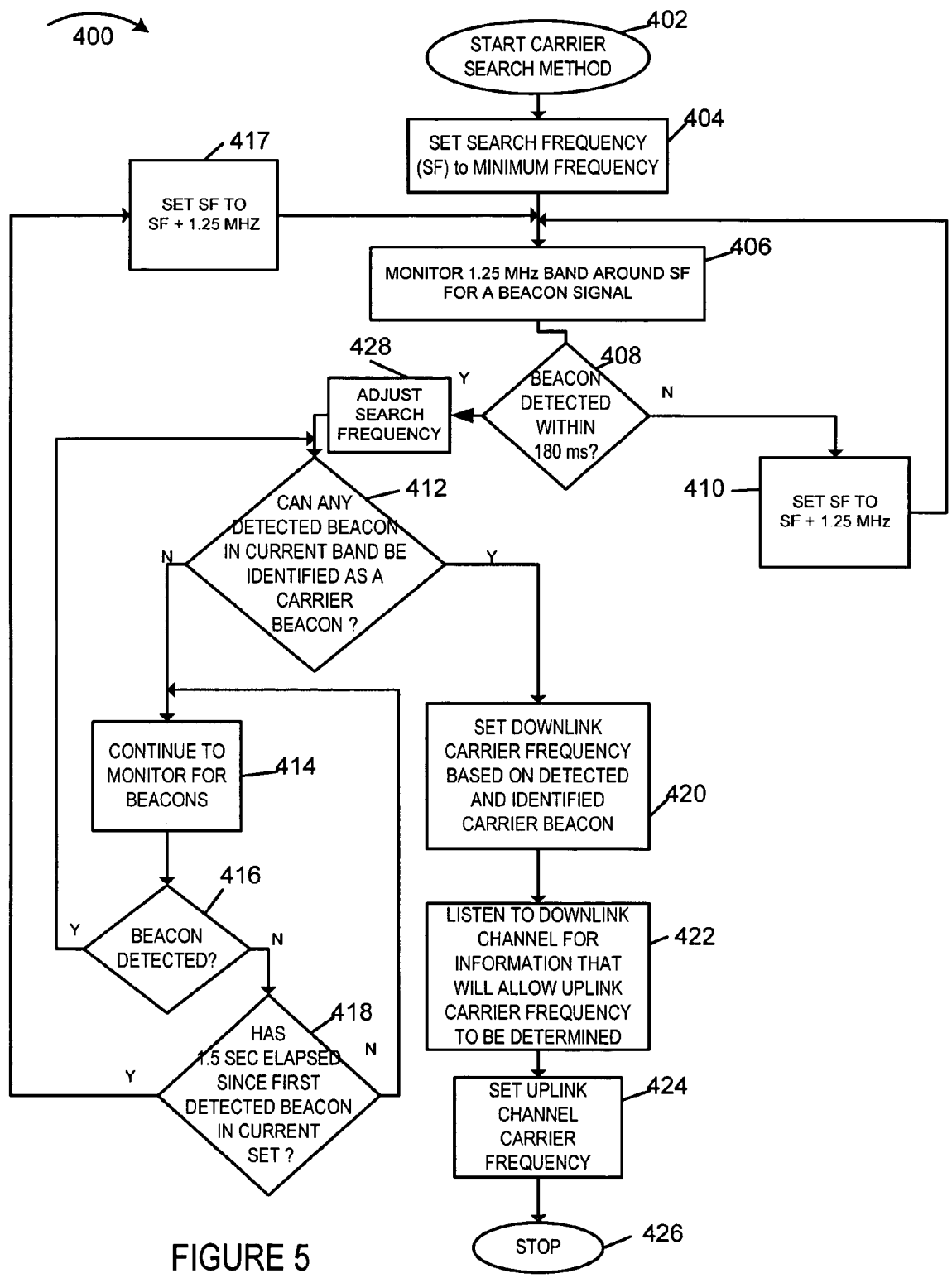
FIG. 5 is a flowchart of an exemplary method for locating carrier frequencies, in accordance with the present invention.

Flowchart 400 of FIG. 5 shows an exemplary method for locating the carrier frequencies, in accordance with the invention. In step 402, the carrier search method is started by the wireless terminal, e.g., as the wireless terminal powers on and initializes in an unknown location. Proceeding to step 404, the wireless terminal sets the search frequency (SF) to a minimum frequency. In other embodiments, the starting search frequency may be set to a value corresponding to the last known search band encompassing the last known carrier frequency. Operation proceeds to step 406, where the wireless terminal monitors a 1.25 MHz band centered around the SF for a beacon signal from the base station. Next, in step 408, the wireless terminal checks whether a beacon was detected within the first time interval. That is, if a beacon slot is about 90 msec, then the first time interval may be between 90 and 180 msec. That is, the wireless terminal may check the existence of a beacon signal in the 1.25 MHz band centered around the SF for 90 or 180 msec. If a beacon signal is detected within the first time interval (e.g., 180 msec) from the start of monitoring in the current band, then operation proceeds to step 428 following detection of the beacon signal; however, if a beacon signal is not detected within the first time interval of the start of monitoring in the current band, then operation proceeds to step 410.

Assuming that a beacon signal was detected in step 408 then operation proceeds to step 428, where the SF is adjusted so that the detected beacon tone is located in the high end of the adjusted search band. The operation then proceeds to step 412. Finding one beacon means that the search band including the carrier frequency and carrier frequency beacon has been found. Now, the carrier beacon can be located by continuing to monitor the beacons within current search band, and waiting until a carrier beacon is detected, and identified (distinguished from the slope/sector beacons) by the wireless terminal. In step 412, a determination is made as to whether any detected beacon in the current band can be identified as a carrier beacon. The slope and sector beacons hop over time following a hopping sequence. In some embodiments, the carrier beacon may be identified as a beacon signal that does not follow the hopping sequence. In some embodiments, the carrier frequency may be identified as a beacon signal occurring at some predetermined approximate position in the search band, e.g., lower in the search band than the slope or sector beacons. Since the carrier frequency beacon is fixed and repeats at a fixed time interval, the wireless terminal may, in some embodiments does, wait to receive two successive carrier beacons to make a positive identification. If in step 412, the carrier beacon has not yet been identified, operation proceeds to step 414, where the wireless terminal continues to monitor for additional beacon signals. In step 416 checks are periodically made as to whether an addition beacon signal has been detected. When another beacon signal is detected in step 416, operation proceeds to step 412, where again a check is performed as to whether any detected beacon in the current band can be identified as a carrier beacon. If the check in step 416 reveals that a beacon signal has not been detected, operation proceeds to step 418, where a time out check is performed. In step 418, the wireless terminal tests whether the second monitoring time interval (e.g., 1.5 sec) has elapsed since the first detected beacon in the current set was detected. In the example, carrier beacons repeat every 1.44 sec. If the 1.5 sec interval (a time out time) has not elapsed, then operation proceeds to step 414 where monitoring for beacons continues. However, if the 1.5 sec time out interval has elapsed, then the wireless terminal has been unable to successfully acquire and identify a carrier beacon within a reasonable interval, e.g., signal channel quality has decreased below an acceptable level since the first (slope/sector) beacon of the current set was detected. In step 417, the search frequency is increased by one step increment, e.g., 1.25 MHz, changing to a new search band. From step 417 operation proceeds to step 406, where the search continues using the new search band.

Returning to step 412, if a detected beacon in the current search band can be identified as a carrier beacon, operation proceeds to step 420. In step 420, the carrier downlink frequency is set based on the detected and identified carrier frequency. A pre-determined and known offset may exist between the frequency of the carrier beacon and the downlink carrier frequency. Next, in step 422, the wireless terminal, using the determined downlink carrier frequency, listens to the downlink channel for information that will allow the uplink carrier frequency to be determined. In some embodiments, the uplink carrier can be at a fixed offset from the downlink carrier. In some embodiments, the fixed offset between downlink and uplink carriers may be pre-known to the wireless terminal, and signaling step 422 may be omitted. Next, in step 424, the wireless terminal sets, the uplink carrier frequency and normal communications between the wireless terminal and base station may proceed. In step 426, the search operation is terminated. In step 422, the wireless terminal may also obtain other system information, such as the identifier of the service provider that is currently operating the service band. The wireless terminal may compare the found identifier of the service provider with its own service agreement to determine whether to access the detected service band. Moreover, the energy strength of the detected beacon signal tells the wireless terminal about the channel quality of the service band, based on which the wireless terminal may determine whether to access the detected service band.

Returning to step 408, if a beacon signal was not detected within the first time interval, the wireless terminal may assume that it is looking in the wrong search band; therefore, operation proceeds to step 410. In step 410, the search frequency is incremented by one step size, e.g., 1.25 MHz, and a new search band is set. Operation proceeds from step 410 back to step 406, where the monitoring for beacons in the new search band is started.

The incrementing processes in steps 410, 417, may be set to check, whether the current SF is the maximum allowable SF, in which case a search band transition would be to the minimum allowable SF, rather than the normal increment of 1.25 Mz.

The above times and frequencies are intended to be exemplary and may vary depending on the particular system implementation.

Figure 6:
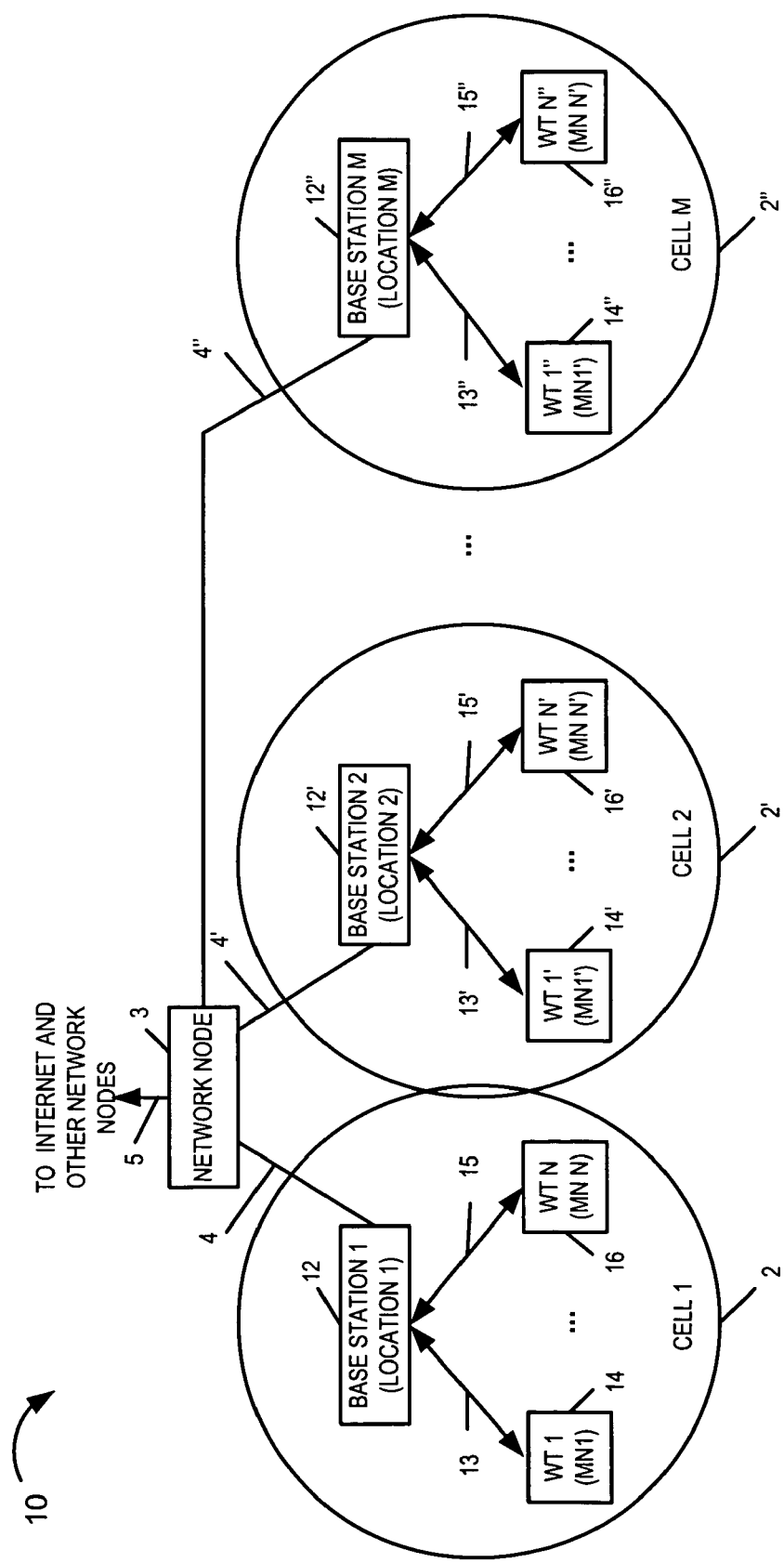
FIG. 6 is a drawing of an exemplary communications system implemented in accordance with the present invention.

FIG. 6 illustrates an exemplary communications system 10 implemented in accordance with the invention. Although shown with one sector per cell, in FIG. 6, in some embodiments, some or all of the cells of the system may be multi-sector cells. Exemplary system 10 includes a plurality of cells (cell 1 (2), cell 2 (2'), cell M (2")). Each cell (cell 1 (2), cell 2 (2'), cell M (2")) represents a wireless coverage area for a base station (BS 1 (12), BS 2 (12') BS M (12"), respectively. At least two base stations at different locations in system 10 use different service bands. Some of the base station in system 10 may have cellular coverage areas which overlap, and some base stations may have cellular coverage areas which do not overlap with the areas of other BSs in the system 10. System 10 also includes a network node 3 coupled to the base stations (BS 1 (12), BS 2 (12'), BS M (12")) via network links (4, 4', 4"), respectively. The network node 3, e.g., a router, is also coupled to the Internet and other network nodes via network link 5. The network links (4, 4', 4", 5) may be, e.g., fiber optic links. Each cell includes a plurality of wireless terminals that are coupled to the cell's base station via wireless links, and if the wireless terminals are mobile devices they may move throughout the system 10. In cell 1 (2), multiple wireless terminals (WT 1 (14), WT N (16)), shown as mobile nodes (MN 1 (14) through MN N (16)), communicate with base station 1 (12) through the use of communication signals (13, 15), respectively. In cell 2 (2'), multiple wireless terminals (WT 1' (14"), WTN' (16')), shown as mobile nodes (MN 1' (14') through MN N' (16')), communicate with base station 2 (12') through the use of communication signals (13', 15'), respectively. In cell M (2"), multiple wireless terminals (WT 1" (14"), WTN" (16")), shown as mobile nodes (MN 1" (14") through MN N" (16")), communicate with base station M (12") through the use of communication signals (13", 15"), respectively. Each mobile terminal may correspond to a different mobile user and are therefore sometimes referred to as user terminals. The signals (13, 15, 13', 15', 13", 15") may be, e.g., orthogonal frequency division multiplexing (OFDM) signals.

Base stations (12, 12', 12") transmit broadcast signals including beacon signals conveying carrier information, in accordance with the methods of the present invention. Mobile nodes (14, 16, 14', 16', 14", 16") implement the carrier search method of the invention upon startup, entering a new cell, and/or upon loss of a carrier signal. The base stations (12, 12', 12") and wireless terminals (MN 1, MN N, MN 1', MN N', MN 1", MN N") (14, 16, 14', 16', 14", 16") each implement the method of the present invention. Thus, signals (13, 15, 13', 15', 13", 15") include signals of the type discussed in this application, which are transmitted in accordance with the invention.

Figure 7:
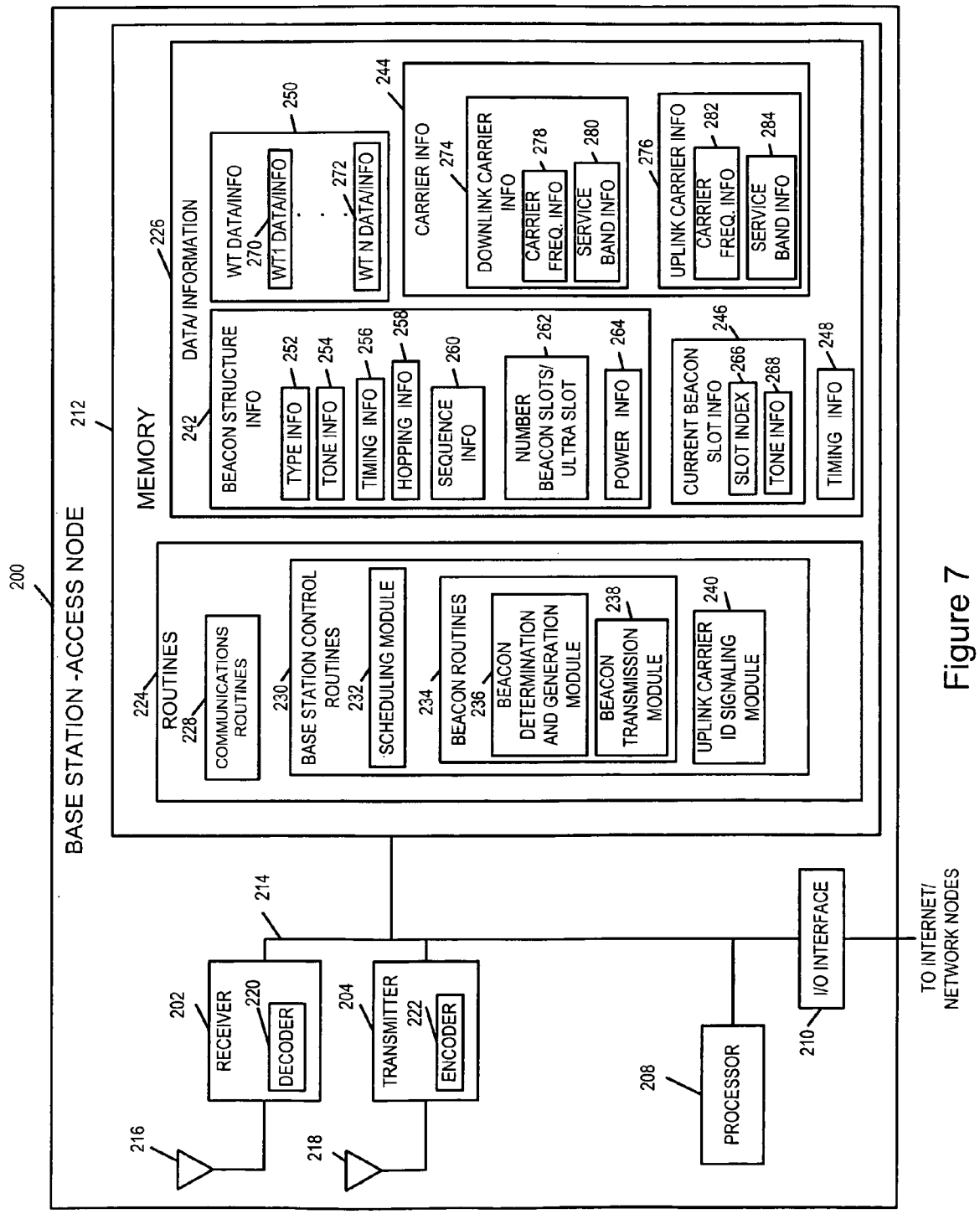
FIG. 7 is a drawing of an exemplary base station implemented in accordance with the present invention and using methods of the present invention.

FIG. 7 illustrates an exemplary base station—access node 200, implemented in accordance with the invention. Base station 200 may be any of the exemplary BSs 12, 12', 12" of FIG. 6. The base station 200 transmits beacon signals, e.g., beacon signals such as those illustrated in FIG. 1 or FIG. 2. Different beacons are transmitted at different times. The beacon signals transmitted in any cell may be cell and/or sector dependent with different cells/sectors transmitting different beacon signals. Base station 200 includes a receiver 202, a transmitter 204, a processor 208, an I/O interface 210, and memory 212 coupled together via bus 214 over which the various elements may interchange data and information. Base station 200 includes receive antenna 216 coupled to receiver 202 through which the BS 200 can receive uplink signals from a plurality of wireless terminals. Base station 200 also includes transmit antenna 218 coupled to transmitter 204 through which the BS 200 sends downlink signals including broadcast signals and user specific signals to a plurality of WTs. The broadcast signals include: beacons signals including carrier beacon signals and, in some embodiments, broadcast information relating downlink carrier information to uplink carrier information. The receiver 202 includes a decoder 220 for decoding received uplink signals while the transmitter 204 includes an encoder 222 for encoding downlink data/information prior to transmission. The P10 interface 210 couples the base station 200 to the Internet and/or to other network nodes, e.g., other base stations, AAA server nodes, home agent nodes, routers, etc. The memory 212 includes routines 224 and data/information 226. The processor 208, e.g., a CPU, executes the routines 224 and uses the data/information 226 in memory 212 to cause the base station 200 to operate in accordance with the invention.

Routines 224 include communications routines 228 and base station control routines 230. Communications routines 228 are used for controlling the base station 200 to perform various communications operations and implement various communications protocols. Base station control routines 230 are used to control the base station 200 to implement the steps of the method of the present invention. The base station control routine 230 includes a scheduling module 232, beacon routines 234, and uplink carrier identification (ID) signaling module 240. The scheduling module 232 is used to control transmission scheduling and/or communication resource allocation. Thus, module 232 may serve as a scheduler. Beacon routines 234 controls the determination, generation, and transmission of beacon signals by base station 200. Beacon routines 234 include a beacon determination and generation module 236 and a beacon transmission module 238. The beacon determination and generation module 236 uses the data/information 226 including the timing information 248 and beacon structure information 242 to determine current beacon slot information 246 and generate a beacon signal corresponding to the current beacon slot information 246. The beacon transmission module 238 uses the data/information 226 including the current beacon slot information 246 and timing information 248 to control the transmission of a generated beacon signal at the appropriate time. Uplink carrier ID signaling module 240 uses the data/information 226 including the uplink carrier information 276 to control the generation and transmission of downlink broadcast signals conveying information to WTs that will allow the uplink carrier frequency to be determined. For example, a WT that has already established the downlink carrier frequency, e.g., through a carrier search method in accordance with the present invention, may receive a broadcast signal providing the offset between the uplink and downlink carriers used by the base station 200.

Data/information 226 includes beacon structure information 242, carrier information 244, current beacon slot information 246, timing information 248, and wireless terminal data/information 250. Beacon structure information 242 includes information defining characteristics of the beacon signals to be determined, generated and transmitted by WT 200. Beacon structure information 242 includes, type information 252, tone information 254, timing information 256, hopping information 258, sequence information 260, number beacon slots/ultra slot 262, and power information 264.

Type information 252 includes information defining the various types of beacons transmitted by BS 200, e.g., carrier beacons, slope beacons, sector beacons. Type information 252 may also include beacon classification information as to whether a particular beacon uses the same tone or set of tones to convey information or whether the particular beacon uses different tones or sets of tones at different times, e.g., following a tone hopping sequence. For example, in some embodiments a carrier beacon uses the same fixed tone while slope and sector beacons use different tones at different times according to a hopping sequence.

Tone information 254 includes information identifying tones or sets of tones used by beacons transmitted from BS 200. Tone information may also include information identifying a range of tones within the downlink service band which may convey beacon signals, e.g., the bandwidth of the range of tones used for beacon signaling may, in some embodiments, be smaller than the bandwidth of the service band.

Timing information 256 includes information defining when a beacon signal should be transmitted. For example, in some embodiments, one beacon signal is transmitted during each beacon slot during a predetermined and fixed OFDM symbol transmission time interval of the beacon slot. Hopping information 258, e.g., a hopping equation or values that can be used to derive a hopping sequence, is used to determine the tone or set of tones used by a beacon which is hopped, during a particular beacon slot within the ultra slot. Sequence information 260 includes a sequence of beacons that are transmitted during an ultra slot. For example, in one embodiment, the first beacon in the ultra slot is a carrier beacon, and the remaining beacons are slope and sector beacons, the remaining beacons alternating between slope and sector beacons on successive beacon slots. Number of beacon slots per ultra slot 262 includes information identifying the number of successive beacon slots in an ultra slot, each beacon slot of successive ultra slots having the same beacon signal. Power information 264 includes information identifying transmission power levels of each beacon signal. In some embodiments, each beacon signal is transmitted at a predetermined power level much higher the power level used for ordinary downlink data and control signaling.

Carrier information 244 includes downlink carrier information 274 and uplink carrier information 276. Carrier information 244 is location dependent. For example, a service provider's base station 200 may have different service bands for different locations. Downlink carrier information 274 includes carrier frequency information 278 and service band information 280. Downlink carrier frequency information 278 includes the carrier used by BS 200 for downlink signaling, e.g., the downlink carrier within the unconventional band for which WTs are searching. Service band information 280 includes the range of frequencies used for downlink signaling by BS 200. In some embodiments, the service band is centered around the downlink carrier frequency. Service band information 280 also includes the bandwidth of the service band. In some embodiments the bandwidth of the service band remains constant throughout the system, but the carrier frequency changes from location to location. Uplink carrier information 276 includes carrier frequency information 282 and service band information 284. Uplink carrier frequency information 282 includes the carrier used by BS 200 for uplink signaling, e.g., the uplink carrier within the unconventional band. Service band information 284 includes the range of frequencies used for uplink signaling by BS 200. In some embodiments, the service band is centered around the uplink carrier frequency. Service band information 284 also includes the bandwidth of the service band. In some embodiments the bandwidth of the service band remains constant throughout the system, but the carrier frequency changes from location to location. In some embodiments, the uplink to downlink carrier interspacing is a fixed offset and remains constant throughout the system. In some embodiments, the uplink to downlink carrier interspacing may vary from location to location. In some such embodiments, uplink carrier ID signaling module 240 performs operations to convey information to WTs corresponding to the intercarrier spacing and/or other uplink carrier information.

Current beacon slot information 246 includes slot index 266 and tone information 268. Slot index 266 is the beacon slot index within the ultra slot corresponding to a beacon signal. Tone information 268 includes a tone or set of tones comprising the current beacon signal and associated power levels concentrated on that tone or tones.

Timing information 248 includes OFDM symbol transmission timing, e.g., a tracking of successive OFDM symbol transmission time intervals within a beacon slot and ultra slot as time progresses.

WT data/information 250 includes a plurality of sets of WT data information (WT1 data/information 270, WTN data/information 272). WT1 data/information 270 includes a set of data/information corresponding to WT1 such as, e.g., active sessions, users, peer nodes in communications sessions with WT1, routing information, user data/information, resource information, e.g., BS 200 assigned identifiers, uplink and downlink assigned traffic channel segments and dedicated control segments.

Servers and/or host devices may be implemented using circuitry which is the same as, or similar to, the circuitry of the exemplary base station—access node 200, e.g., access router, shown in FIG. 4 but with interfaces and/or control routines suited to the particular server/host device's requirements. The control routines and/or hardware in such servers and/or hosts cause the devices to implement the methods of the present invention.

Figure 8:
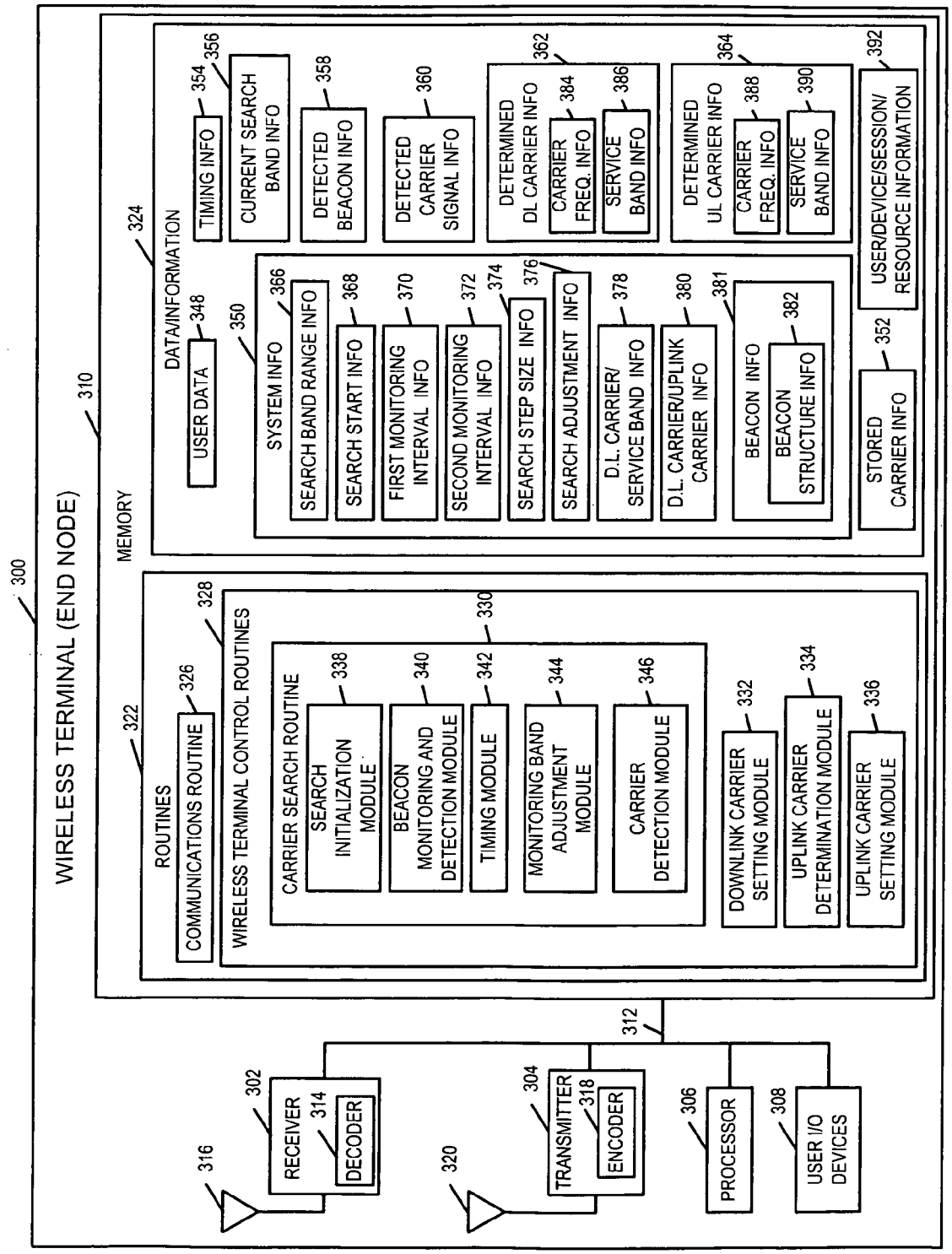
FIG. 8 is a drawing of an exemplary wireless terminal (end node), e.g., mobile node, implemented in accordance with the present invention and using methods of the present invention.

FIG. 8 illustrates an exemplary wireless terminal (end node) 300, e.g., a mobile node, implemented in accordance with the present invention which is capable of performing the carrier search method of the invention. Exemplary WT 300 may be any of the WTs (14, 16, 14', 16', 14", 16") of FIG. 6. The mobile node 300 may be used as a mobile terminal (MT). The wireless terminal 300 includes a receiver 302, a transmitter 304, a processor 306, user I/O device 308, and a memory 310 coupled together via bus 312 over which the various elements may interchange data and information. Memory 310 includes routines 322 and data/information 324. Receiver 302 is coupled to a receive antenna 316 through which WT 300 receives downlink signals from BSs including: beacon signals conveying carrier information, and in some embodiments, broadcast signals from BSs conveying information linking the downlink carrier to the uplink carrier. Receiver 302 includes a decoder 314 for decoding received encoded downlink signals. Transmitter 304 is coupled to a transmitter antenna 320 through which uplink signals, including uplink traffic channel signals, are conveyed to a BS from WT 300. Transmitter 304 includes an encoder 318 for encoding data/information into encoded uplink signals prior to transmission to a base station. In some embodiments, the decoder 314 and the encoder 318 use low density parity check (LDPC) codes. Processor 306, e.g., a CPU, executes routines 322 and uses data/information 324 in memory 310 to control the operation of WT 300 and implement methods of the present invention including carrier search. User I/O devices 308, e.g., keyboard, keypad, mouse, microphone, camera, display, speaker, etc., allow the user of WT 300 to input user data/information intended for peer nodes and to output user data/information received from peer nodes.

Routines 322 include communications routine 326 and wireless terminal control routines 328. Wireless terminal control routines 328 include carrier search routine 330, downlink carrier setting module 332, uplink carrier determination module 334, and uplink carrier setting module 336.

Communications routines 326 implement the various communications protocols used by WT 300. WT control routines 328 control the operation of the WT receiver 302, transmitter 304, user I/O devices 308, and implement the methods of the present invention. Carrier search routine 330 causes the WT 300 to implement a carrier search method in accordance with the present invention. The carrier search routine 330 includes a search initialization module 338, a beacon monitoring and detection module 340, a timing module 342, a monitoring band adjustment module 344, and a carrier detection module 346.

Search initialization module 338 uses the data/information 324 including the search start info 368 and, in some embodiments, stored carrier information 352, to select a first frequency band to be monitored when the search is started. Information pertaining to this interval to be searched is stored by module 338 in current search band information 356. For example, in some embodiments or under some set of conditions, the search initialization module 338 starts the search in a band at the lowest extreme of the downlink band to be searched as identified in search start info 368. In other embodiments or under some other set of conditions the search initialization 338 starts the search in a band identified in stored carrier information 352, e.g., one band from a set of previously used downlink service bands such as the last previously used downlink service band. The search initialization module 338 tunes the WT's receiver 302 to the selected current search band.

Beacon monitoring and detection module 340 uses the data/information 324 including system info 350 and current search band info 356 to perform monitoring of downlink signaling within the current search band to detect and identify beacon signals. For example, received beacon signals may be recognized by the characteristics of high power concentrated on one or a few tones. When beacon monitoring and detection module 340 detects a beacon signal, information, e.g., tone and timing information, corresponding to the detected beacon signal is stored in detected beacon info 358. In some embodiments, a detected beacon signal by module 340 interrupts and/or terminates a monitoring interval, and triggers a further operation, e.g., a service band adjustment and the start of a different type of monitoring interval. In other embodiments, beacon monitoring intervals are not interrupted or prematurely terminated by the detection of one or more beacon signals. Timing module 342 uses the data/information 324 to control timing operations including: starting monitoring intervals, tracking the time completed in a first or second type monitoring interval, checking if the monitoring interval has expired, and triggering additional operations when a monitoring interval expires. Timing module 342 stores information in timing information 354. Monitoring band adjustment module 344 uses data/information 324 including search step size info 368 and search adjustment info 376 to adjust the search band changing current search band information 356. For example, if a 1st first timing interval has expired as indicated by the timing module 342 without the detection of a beacon signal by beacon monitoring and detection module 340, then the monitoring band adjustment module 344 may increment the current search band by one search step size and control the receiver 302 to retune to the new search band, and the monitoring band adjustment module 344 can signal the timing module to start a 2nd first monitoring time interval. As another example, consider that the beacon monitoring and detection module 340 has detected a beacon signal within a first monitoring interval, the monitoring band adjustment module 344 may change the search band in accordance with the search adjustment information 376, e.g., lowering the search band so that the detected beacon signal is placed at the top of the new search band. Adjustment module 344 stores the new search band information in current search band information 356, controls the receiver 302 to retune to the new search band, and signals the timing module 342 to start a second monitoring time interval.

Carrier detection module 346 uses the data/information 324 including the detected beacon information 358 and system information 350 to obtain detected carrier signal information 360 and determined downlink carrier information 362. For example, the detected beacon information 358 during the second monitoring interval may include information indicating that two beacons signals have been received at the same fixed tone and are separated by the time interval of an ultra slot, indicating by beacon structure information 382 a carrier beacon has been detected and carrier detection module obtains detected carrier signal information 360. Then, using the DL carrier/service band information 378, e.g., information indicating the carrier frequency and associated service band in relationship to the carrier beacon tone, e.g., a fixed offset between the carrier beacon tone and the carrier frequency and/or the carrier beacon tone position with respect to a service band boundary, the carrier detection module 346 determines downlink carrier information 362.

Downlink carrier setting module 332 uses the data/information 324 including the determined downlink carrier information 362 to set, e.g., tune, the receiver 302 to the carrier frequency and service band.

Uplink carrier determination module 334 determines the carrier and service band to be used by the WT 300 for uplink signaling. In some embodiments, there is a fixed relationship between the downlink and corresponding uplink carriers throughout the system. In such an embodiment, the uplink carrier determination module 334, after the downlink carrier has been determined, uses the data/info 324 including the determined downlink carrier information 362 and D.L. carrier/uplink carrier info 380, e.g., a stored fixed offset, to determine the UL carrier information 364. In some embodiments, the spacing between the downlink and corresponding uplink carriers changes for different base station locations in the systems, e.g., as shown in FIG. 3. In one such embodiment, after the WT 300 has tuned its receiver to the determined DL carrier, the WT 300 receives and processes, using module 334, a broadcast signal from the BS indicating information which can be used to derive determined UL carrier information 364. For example, the broadcast signal may indicate the UL carrier frequency or the broadcast signal may indicate an offset of the uplink carrier frequency from the downlink carrier frequency.

Uplink carrier setting module 336 uses the data/information 324 including the determined UL carrier information 364 to set, e.g., tune, the transmitter 304 so that the WT can transmit uplink signals to the base station in the appropriate service band.

Data/information 324 includes user data 348, system information 350, stored carrier information 352, timing information 354, current search band information 356, detected beacon information 358, detected carrier signal information 360, determined downlink carrier information 362, determined uplink carrier information 364, and user/device/session/resource information 392.

User data includes data and information, e.g., voice, text, user application, and/or video data/information to be communicated to/received from peers of WT 300 in communications sessions with WT 300.

System information 350 includes search band range information 366, search start information 368, first monitoring interval information 370, second monitoring interval information 372, search step size information 374, search adjustment information 376, downlink carrier/service band information 378, downlink carrier/uplink carrier information 380, and beacon information 381. Search band range information 366 includes information identifying the downlink band to be searched, e.g., the downlink band within an unconventional band. Search band range information 366 also includes limits on the range including a minimum frequency and/or a minimum search setting frequency. Search start information 368 includes information identifying the starting search band to be used, e.g., a search band at the lowest position in the downlink band to be search and/or information identifying a search start technique to be used, e.g., use the last successfully determined service band which has been saved in stored carrier information 352. First monitoring interval information 370 includes information identifying the duration of a first monitoring time interval in which operation will proceed to a second monitoring time interval if any beacon is detected during the first monitoring time interval. First monitoring time interval 370 also includes information identifying as to whether the first monitoring interval is terminated upon detection of a beacon signal or whether the first monitoring interval is completed before proceeding to a second monitoring time interval. In some embodiments, the first monitoring time interval is set in the range of 1 to 2 beacon slot intervals or slightly larger. For example, in one exemplary embodiment with a beacon slot of 90 msec, the first monitoring interval is set to 180 msec. Second monitoring interval information 372 includes information identifying the duration of a second monitoring time interval in which the search band is searched to identify a carrier beacon. Second monitoring time interval 372 also includes information identifying as to whether the second monitoring interval is terminated upon determination of a carrier beacon signal or whether the second monitoring interval is completed before proceeding to use the determined carrier information. In some embodiments, the second monitoring time interval is set in the range of 1 to 2 ultra slots or slightly larger. For example in one exemplary embodiment, where an ultra slot is 1.44 sec, the second monitoring interval is set to 1.5 sec. Search step size interval 374 includes information identifying the amount to change, e.g., shift to a higher frequency, the current search band, following the completion of a first type monitoring interval without the detection of a beacon signal. Search adjustment information 376 includes information used to control the amount of adjustment, e.g., shift, of the current search band following the detection of a beacon signal during a first monitoring interval. For example, in some embodiments a carrier beacon is at a fixed frequency position in the service band which is a lower tone than any other beacon signal and beacon tones occupy some defined subset range of the service band. In such an embodiment, the search adjustment information 376 may include information used to determine where to position the search band with respect to the detected beacon to ensure that a carrier beacon should be detected during the second monitoring interval, e.g., move the carrier band so that the detected beacon signal is at the top of the search band. Downlink carrier/service band information 378 includes information identifying the relationship between the downlink carrier and the downlink service band, e.g., the downlink service band is centered around the downlink carrier and occupies a specified bandwidth. Info 378 also includes information identifying the relationship between the carrier beacon and the carrier frequency, e.g., the number of tones and the direction, lower or higher, that the carrier beacon tone is offset from the carrier frequency. Downlink carrier/uplink carrier information 380 includes information used to determine the uplink carrier frequency of a base station based upon a detected downlink carrier. For example, in some embodiments, the uplink carrier is a fixed offset from the downlink carrier, and that fixed value of uplink/downlink carrier spacing is stored in information 380. In some embodiments, the uplink/downlink carrier spacing varies from location to location, and each BS sends a broadcast message with information that may be used by WT 300 to derive the uplink carrier from said message. In one such embodiment, information 380 includes information identifying the broadcast message and parameters used to derive the uplink carrier from said broadcast message and/or the determined downlink carrier.

Beacon information 381 includes beacon structure information 382. Beacon structure information 382 includes beacon type information, tone information, timing information, hopping information, sequence information, number of beacon slots/ultra slot, and power information. Exemplary beacon structure information 382 is similar to beacon structure information 242, previously described with respect to exemplary BS 200.

Stored carrier information 352 includes information on carriers and service bands which have been previously found by a carrier search operation and may have been previously used by WT 300 for communications. Stored carrier information 352, in some embodiments, includes time tag and or frequency of use information on each of the sets of stored carrier information. In such an embodiment, WT 300 may start a carrier search at the last used carrier or the most frequently used carrier.

Timing information 354 includes OFDM symbol transmission timing, e.g., a tracking of successive OFDM symbol transmission time intervals within a beacon slot and ultra slot as time progresses. Timing information 354 also includes information tracking timing such as time remaining in a first monitoring interval or time remaining in a second monitoring interval.

Current search band information 356 includes information identifying the settings of the current search band, e.g., frequency and bandwidth. Current search band information 356 also includes information identifying when the current search band search started.

Detected beacon information 358 includes information pertaining to detected beacons during the first monitoring intervals and second monitoring intervals including: tone or tones used by each detected beacon, timing of beacon within the ultra slot, beacon type, etc. For example, a first beacon may be detected during the first monitoring interval and at least a second beacon may be detected during the second monitoring interval. Detected carrier signal information 360 includes the carrier signal frequency which has been determined from at least the frequencies of the first and second detected beacon signals.

Determined downlink carrier information 362 includes carrier frequency information 384, e.g., the carrier from information 360, and its corresponding service band information 386, e.g., a bandwidth of the downlink service band and information identifying the position of the downlink carrier within the service band, e.g., centered.

Determined uplink carrier information 364 includes carrier frequency information 388, e.g., from the uplink carrier determination module 334, and its corresponding service band information 390, e.g., a bandwidth of the uplink service band and information identifying the position of the uplink carrier within the service band, e.g., centered.

User/device/session/resource information 392, e.g., user/device identification information, session information including peer node identification and routing information, and resource information such as assigned uplink and downlink traffic channel segments and control channel segments for WT 300, may be accessed and used to implement the methods of the present invention and/or data structures used to implement the invention.

Figure 9:
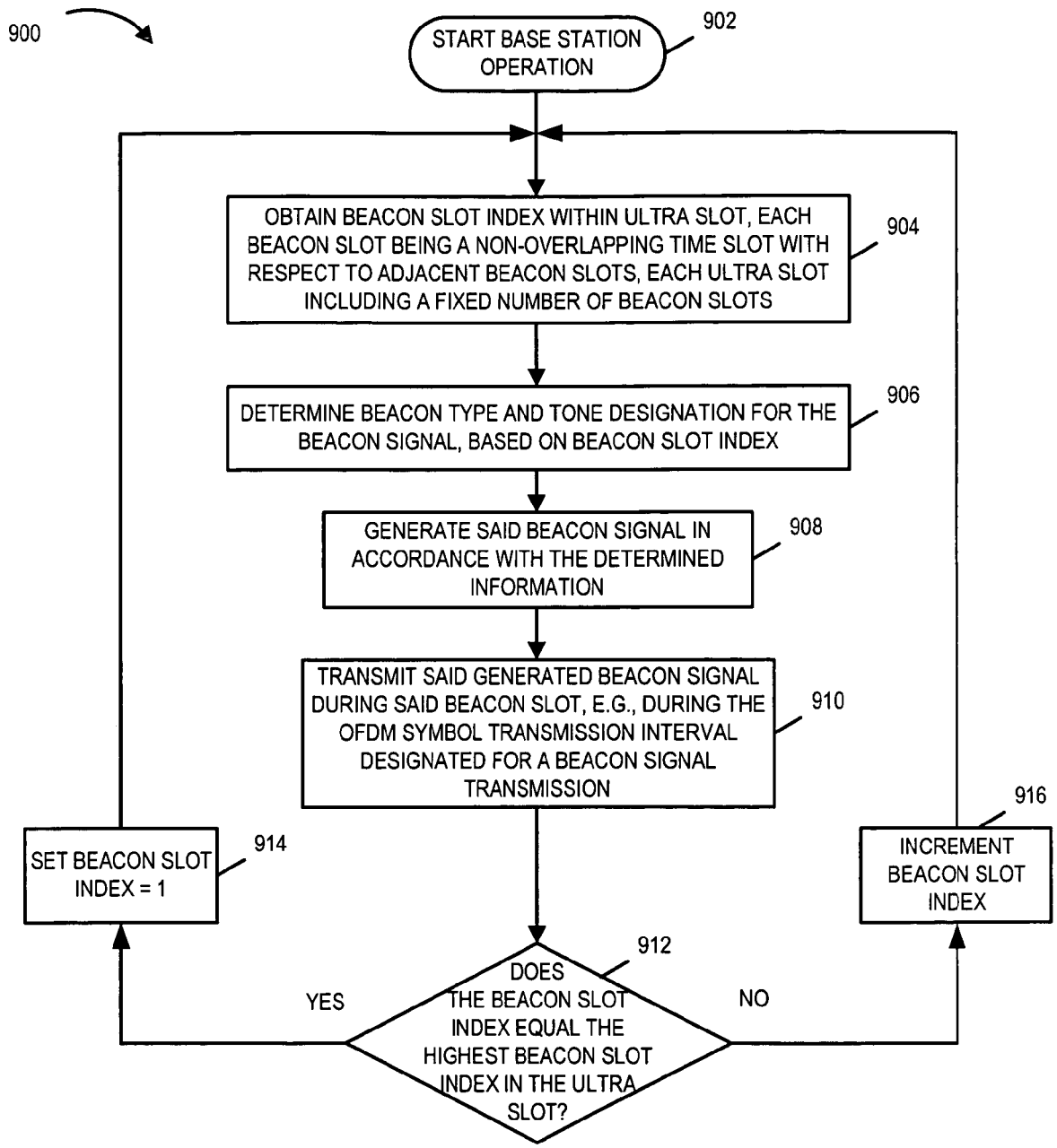
FIG. 9 is a flowchart of an exemplary method of operating a base station to transmit beacon signals in accordance with the present invention.

FIG. 9 is a flowchart 900 of an exemplary method of operating a base station, e.g., BS 200, to transmit beacon signals in accordance with the present invention. Operation starts in step 902, where the base station is powered on and initialized. As part of initialization, the beacon slot index may be set to one, the lowest index beacon slot in an ultra slot. Operation proceeds from step 902 to step 904. In step 904, the base station is operated to obtain the beacon slot index within the ultra slot. Each beacon slot is a non-overlapping time slot with respect to adjacent beacon slots. Each ultra slot includes a fixed number of beacons slots. Operation proceeds from step 904 to step 906, where the base station determines the beacon type and tone designation for the next beacon signal based upon the beacon slot index. Each beacon is one of a plurality of different types of beacons, each beacon of the different types being transmitted on a different tone or set of tones within the same frequency band. In some embodiments, a first type of beacon signal has a fixed frequency location with respect to the lowest tone in the frequency band. In some embodiments, the first type of beacon has a fixed frequency location which is lower or higher than all other types of beacons transmitted by the base station within the service band. In some embodiments, the first type of beacon signal is referred to as a carrier beacon. In some embodiments, other types of beacons include slope and/or sector beacons. In some embodiments, the slope and/or sector beacons use frequency tones which hop over time. In some embodiments, the first type of beacon signal, e.g., the carrier beacon, occurs less frequently than other types of beacon signals, e.g., one carrier beacon per ultra slot, and multiple slope/sector type beacons signals per ultra slot.

Next, in step 908, the base station is operated to generate said beacon signal in accordance with the determined information from step 906. Then, in step 910, the base station is operated to transmit said generated beacon signal during said beacon slot, e.g., during the OFDM symbol transmission time interval designated for a beacon signal transmission. Operation proceeds from step 910 to step 912. In step 912, the base station is operated to check if the beacon slot index equals the highest beacon slot index in the ultra slot. If the beacon slot index equals the highest beacon slot index in an ultra slot, then the beacon signaling for the ultra slot has been completed, and operation proceeds to step 914. Within a complete ultra slot, the base station has transmitted each beacon of a different type at least once. In step 914 the base station is operated to set the beacon slot index equal to one, representing the first beacon slot of a new ultra slot. However, if in step 912, it is determined that the beacon slot index does not equal the highest beacon slot index in the ultra slot, then operation proceeds to step 916. In step 916, the base station is operated to increment the beacon slot index. Operation proceeds from either step 914 or step 916, back to step 904.

Figures 10, 10A:
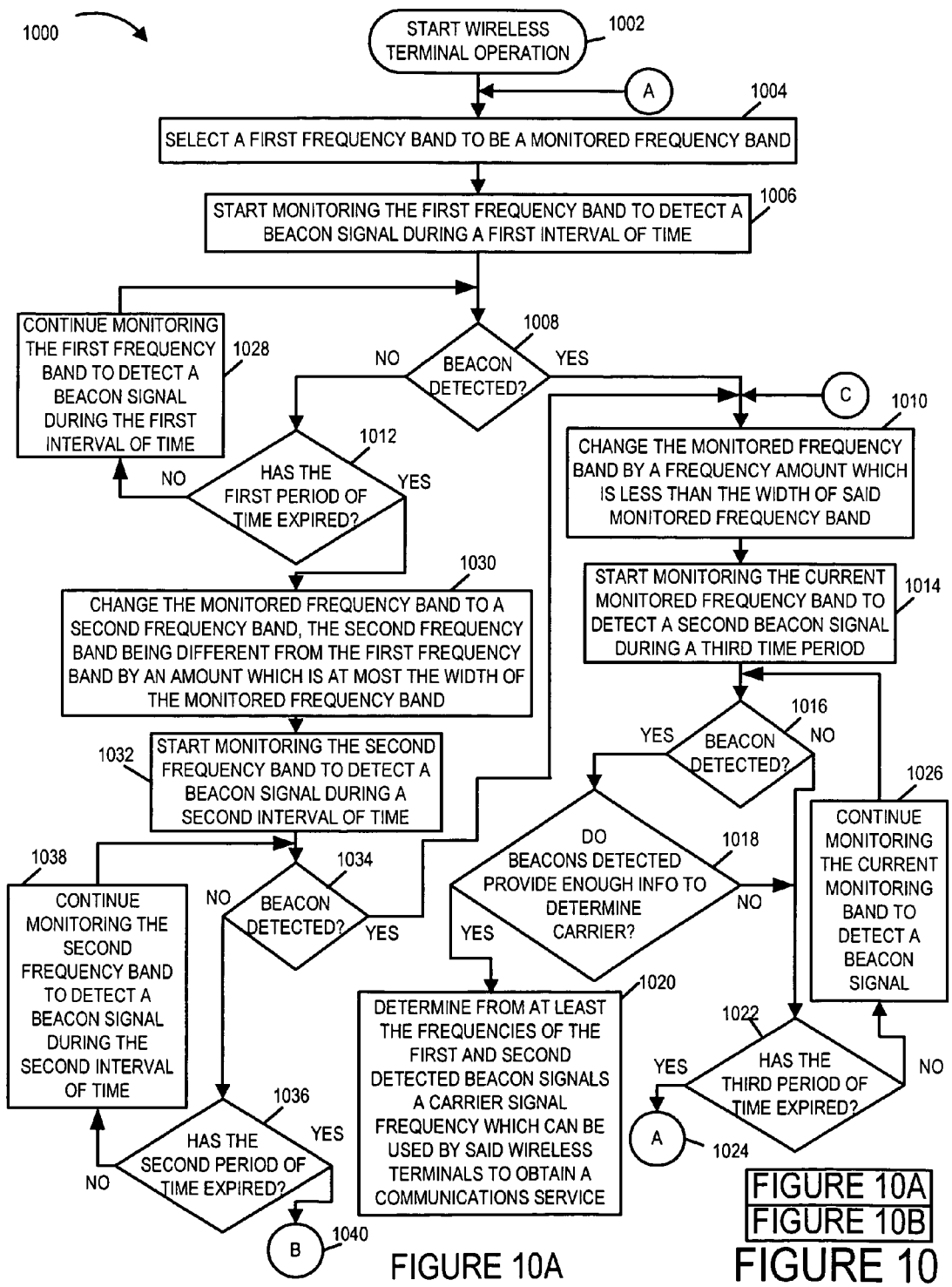
FIG. 10 comprising the combination of FIG. 10A
Figure 10B:
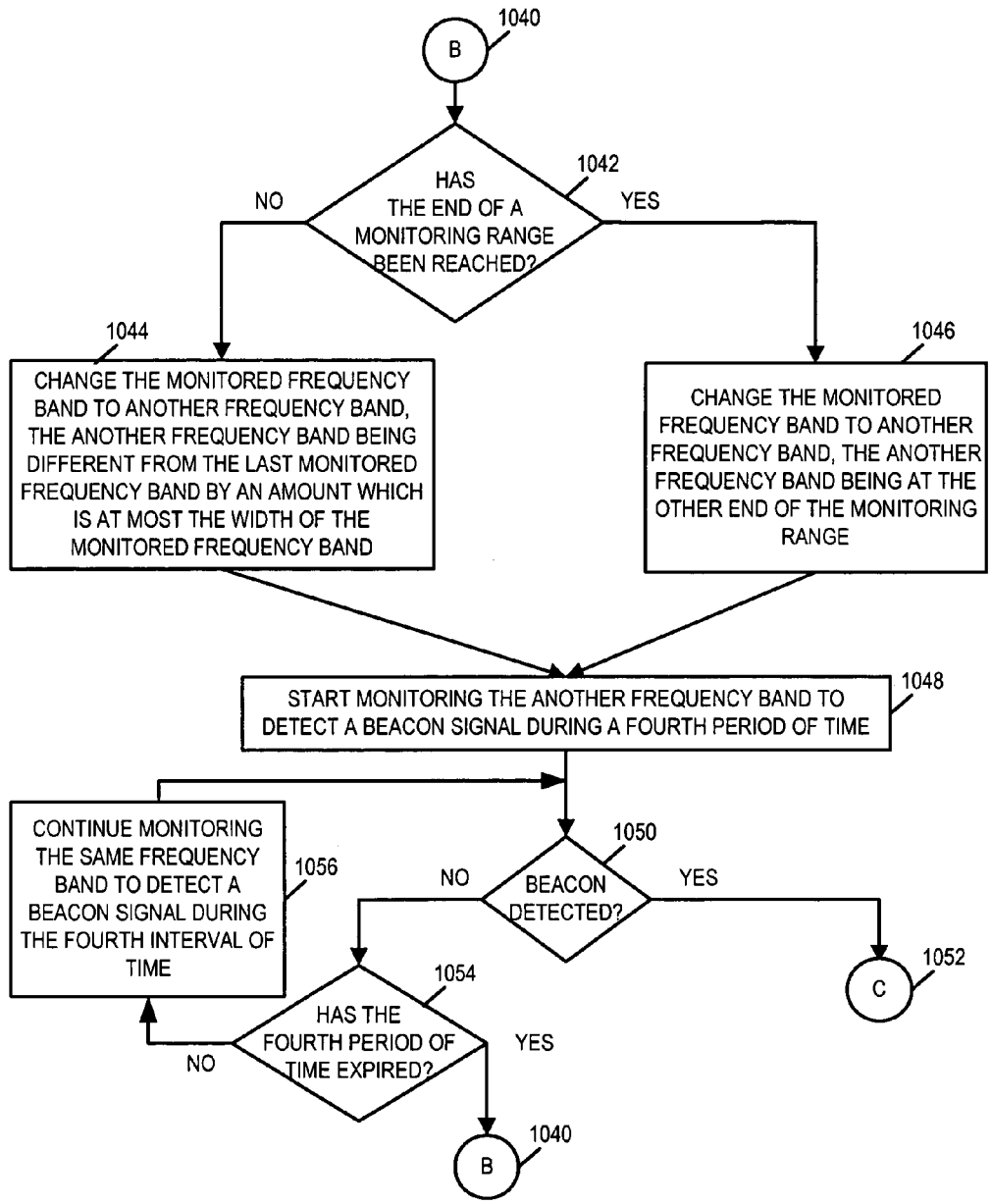
FIG. 10B is a flowchart of an exemplary method of operating a wireless terminal (WT) to detect a carrier signal transmitted by a base station which transmits beacon signals on a periodic basis, in accordance with the present invention.

FIG. 10 comprising the combination of FIG. 10A and FIG. 10B is a flowchart 1000 of an exemplary method of operating a wireless terminal (WT), e.g., WT 300, to detect a carrier signal transmitted by a base station, e.g., BS 200, which transmits beacon signals on a periodic basis, in accordance with the present invention. The exemplary method starts in step 1002, when the wireless terminal is powered on and/or initialized to start the search method. Operation proceeds from start step 1002 to step 1004.

In step 1004, the WT is operated to select a first frequency band to be a monitored frequency band. For example, if the wireless terminal was just powered on, the WT may use the frequency band last used by the WT as the selected first frequency band, a likely frequency band based on previous WT operations, or a predetermined selected band such as the lowest frequency band in the range to be searched. Operation proceeds from step 1004 to step 1006.

In step 1006, the WT is operated to start monitoring the first frequency band to detect a beacon signal during a first interval of time. For example, the WT tunes a receiver to the selected band of step 1004, starts to receive signaling within the selected monitoring band, and evaluates any received signal to determine if a beacon signal, e.g., a beacon signal being a signal including one or more high power narrow bandwidth signals transmitted at the same time, has been received. In some embodiments, the beacon signals may be a plurality of different types, a first type, e.g., a carrier beacon signal, being transmitted on a tone having a fixed offset from the lowest tone in a corresponding frequency service band, said first type of beacon signal being transmitted using the lowest or the highest tone of any of said beacon signals transmitted in said frequency service band. In some embodiments, the operation of detecting a beacon signal includes detecting the energy of said beacon signal without determining the phase of said beacon signal. In some embodiments, the first interval of time is an interval slightly larger than a beacon slot, e.g., 1 to 2 beacon slots or slightly larger. Operation proceeds from step 1006 to step 1008.

In step 1008, the WT checks as to whether a beacon has been detected. If a beacon has been detected, operation proceeds to step 1010; otherwise operation proceeds to step 1012. In step 1010, the WT changes the monitored frequency band by an amount which is less than the width of said monitored frequency band. In some embodiments, under some conditions, the change of step 1010 is a change of zero Hz. In some embodiments, the monitored frequency band is changed so that the monitored frequency band has the frequency of the detected beacon signal at a pre-selected offset from the top of the monitored frequency band. In some embodiments, the change of step 1010 is such that continual monitoring of the monitored frequency band should detect within its band, a beacon signal of the first type, e.g., a carrier beacon. Operation proceeds from step 1010 to step 1014.

In step 1014, the wireless terminal is operated to start monitoring the current monitored frequency band to detect a second beacon signal during a third time period. For example, the third time period may be an interval slightly larger than an interval which includes at least one of first type beacon signals, e.g., the beacon type signal from which the carrier may be determined. In some embodiments, the third type interval is slightly larger than an ultra slot. Operation proceeds from step 1014 to step 1016.

In step 1016, the WT checks as to whether a beacon has been detected. If a beacon was detected, operation proceeds from step 1016 to step 1018. In step 1018, a check is performed as to whether the detected beacons provide enough information to determine the carrier. In different embodiments, different numbers of beacons may need to be detected before the carrier can be determined depending upon particular factors in the beacon signaling such as, e.g., number of beacon types, characteristics of beacons types such as whether or not tones are hopped for a beacon type, pattern of beacon types in a sequence of beacon signals in an ultra slots. For example, in an embodiment including only two types of beacon signals, e.g., a carrier type and a cell identifier type, in which the beacons tones assigned to beacon signals are not hopped, and the beacon signals alternate between the two types, receiving two successive beacon signals should be enough to determine the carrier beacon. As another example, consider an embodiment, with three different types of beacons: carrier, cell (slope) identifier, sector identifier; the carrier beacon uses a fixed tone in the band while the cell (slope) and sector types use tones which hop over time; the base station transmits one beacon signal per beacon slot; the beacon types follow a sequence of (i) slope type beacon, (ii) sector type beacon, (iii) slope type beacon, (iv) sector type beacon, (v) carrier type beacon in successive beacon slots in an ultra slot or portion of an ultra slot. In such an embodiment, it may be necessary to detect up to five beacons before determining the carrier. As another example, consider an embodiment, with three different types of beacons: carrier, slope, and sector; the carrier beacon uses a fixed tone in the band while the slope and sector beacons use tones which hop over time; the beacon follows a sequence of one carrier beacon during the first beacon slot of an ultra slot followed by either a slope or sector beacon during each of the remaining beacon slots of the ultra slot. In such an embodiment, it may be necessary to detect two successive carrier beacons spaced apart by an ultra slot to identify the carrier beacon.

Assuming that the detected beacon signals, thus far, provide enough information to determine the carrier, operation proceeds from step 1018 to step 1020. In step 1020, the wireless terminal is operated to determine from at least the frequencies of the first and second beacon signals a carrier signal frequency which can be used by the wireless terminal to obtain a communications service. However, if the detected beacon signals, thus far, do not provide enough information to determine the carrier, then operation proceeds from step 1018 to step 1022. In step 1022, the wireless terminal is operated to check if the third time period has expired. If the third time period has expired without the wireless terminal detecting sufficient beacons to determine a carrier, as was expected, this may indicate that the WT has moved out of range of the base station since the first beacon was detected, and therefore the wireless terminal should search within a new band. Temporary interference may also have occurred preventing the detection of the carrier beacon. If the third time period has expired, operation proceeds from step 1022 via connecting node A 1024 to step 1004 to restart search operations. For example, at this point step 1004 can select the next band that has not yet been searched, or step 1004 can repeat the search of the current band.

Returning to step 1022, if the third period of time has not expired, operation proceeds to step 1026, where the wireless terminal continues monitoring the current monitoring band to detect a beacon signal. Operation proceeds from step 1026, to step 1016.

Returning to step 1008, if a beacon signal was not detected, operation proceeds to step 1012, where the WT is operated to check as to whether the first period of time has expired. If the first period of time has not expired, operation proceeds from step 1012 to step 1028 where the WT is operated to continue monitoring the first frequency band to detect a beacon signal during the first interval of time. Operation proceeds from step 1028 to step 1008. If the first period of time has expired, then operation proceeds from step 1012 to step 1030. In step 1030, the WT is operated to change the monitored frequency band to a second monitored frequency band, the second monitored frequency band being different from the first monitored frequency band by an amount which is at most the width of the monitored frequency band. Then, in step 1032, the WT starts monitoring the second frequency band to detect a beacon signal during a second interval of time. In some embodiments, the second interval of time has the same duration as the first interval of time. Operation proceeds from step 1032 to step 1034.

In step 1034, the wireless terminal is operated to check if a beacon has been detected. If a beacon was detected, operation proceeds to step 1010; otherwise operation proceeds from step 1034 to step 1036. In step 1036, the WT checks as to whether the second time period has expired. If the second time period has not expired, operation proceeds from step 1036 to step 1038 where the WT continues to monitor the second frequency band to detect a beacon signal during the second interval of time. From step 1038 operation proceeds to step 1034.

If in step 1036, the second time period was determined to have expired, the search of the second frequency band has been unsuccessful, and operation proceeds via connecting node B 1040 to step 1042. In step 1042, the WT checks as to whether the end of the monitoring range has been reached. If the end of the monitoring range has not been reached operation proceeds from step 1042 to step 1044; otherwise operation proceeds to step 1046.

In step 1044, the WT is operated to change the monitored frequency band to another frequency band, the another frequency band being different from the last monitored frequency band by an amount which is at most the width of the monitored frequency band. In step 1046, the WT is operated to change the monitored frequency band to another frequency band, the another frequency band being at the other end of the monitoring range. Operation proceeds from either step 1044 or step 1046 to step 1048, where the WT starts monitoring the another frequency band to detect a beacon signal during a fourth period of time. In some embodiments, the fourth period of time is the same duration as the first and/or second periods of time.

Operation proceeds from step 1048 to step 1050, where a check is performed as to whether a beacon has been detected. If a beacon has been detected, operation proceeds from step 1050 via connecting node C 1052 to step 1010. However; if a beacon has not been detected, operation proceeds to step 1054, where the WT checks as to whether the fourth period of time has expired. If the fourth period of time has not expired, operation proceeds from step 1054 to step 1056 where the WT continues monitoring the same frequency band to detect a beacon signal during the fourth interval of time. Operation proceeds from step 1056 to step 1050.

Returning to step 1054, if the fourth time period has expired, operation proceeds via connecting node B 1040 to step 1042.

Figure 11:
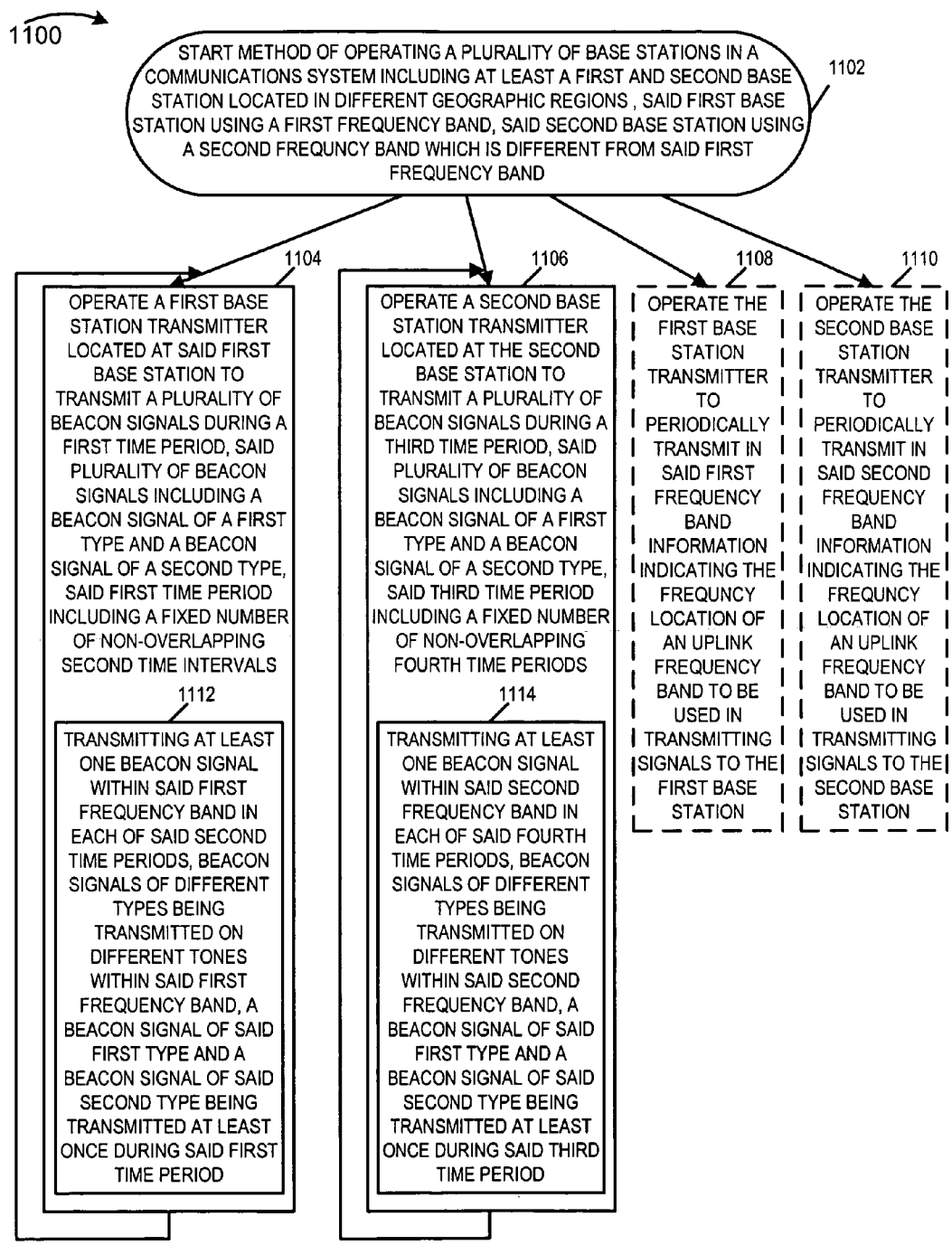
FIG. 11 illustrates the steps of an exemplary base station signaling method of the invention wherein beacon signals by a plurality of different base stations.

FIG. 11 is a flowchart 1100 of an exemplary method of operating a plurality of base stations in a communications system including at least a first and second base station located in different geographic regions. The first base station uses a first frequency band, while the second base station uses a second frequency band, the second frequency band being different from the first frequency band. Operation starts in step 1102 where the base stations of the communications system are powered on. Operation proceeds from step 1102 to steps 1104 and 1106, and optionally, in some embodiments, to steps 1108 and 1110.

In step 1104, a first base station transmitter located at said first base station is operated to transmit a plurality of beacon signals during a first time period, said plurality of beacon signals including a beacon signal of a first type and a beacon signal of a second type, said first time period including a fixed number of non-overlapping second time intervals. Step 1104 includes the operations of sub-step 1112. In sub-step 1112, the first base station transmitter is operated to transmit at least one beacon signal within said first frequency band in each of said second time periods, beacon signals of different types being transmitted on different tones within said first frequency band, a beacon signal of said first type and a beacon signal of said second type being transmitted at least once during said first time period. Operation proceeds from the completion of step 1104 to the start of step 1104 for a repetition of first base station transmitter beacon transmissions during another first time period, e.g., the next successive first time period.

In step 1106, a second base station transmitter located at said second base station is operated to transmit a plurality of beacon signals during a third time period, said plurality of beacon signals including a beacon signal of a first type and a beacon signal of a second type, said third time period including a fixed number of non-overlapping fourth time intervals. Step 1106 includes the operations of sub-step 1114. In sub-step 1114, the second base station transmitter is operated to transmit at least one beacon signal within said second frequency band in each of said fourth time periods, beacon signals of different types being transmitted on different tones within said second frequency band, a beacon signal of said first type and a beacon signal of said second type being transmitted at least once during said third time period. Operation proceeds from the completion of step 1106 to the start of step 1106 for a repetition of second base station transmitter beacon transmissions during another third time period, e.g., the next successive third time period.

In some embodiments, e.g., various embodiments where the downlink to uplink carrier interspacing varies in the communications system for different base stations at different locations, steps 1108 and 1110 are performed. In step 1108, the first base station transmitter is operated to periodically transmit in said first frequency band information indicating the frequency location of an uplink frequency band to be used in transmitting signals to the first base station. In step 1110, the second base station transmitter is operated to periodically transmit in said second frequency band information indicating the frequency location of an uplink frequency band to be used in transmitting signals to the second base station.

In some embodiments, e.g., various embodiments where the downlink to uplink carrier interspacing is fixed in the communications system, WTs determine a downlink communications band from the BS beacon signaling, e.g., step 1104 or 1106, and then knowing the fixed downlink to uplink carrier spacing, the WTs determine the uplink carrier band without the BS having to communicate broadcast additional signals. In such embodiments, steps 1108 and 1110 may be omitted.

In some embodiments, the first and second base station transmitters transmit orthogonal frequency division multiplexed (OFDM) signals in parallel on a plurality of tones during said first and third time periods.

In some embodiments, said first and third time periods each include a plurality of at least 10,000 OFDM symbol transmission time periods. In some embodiments, each first time period includes at least 16 of said second time periods. In some embodiments the first and third time periods have the same length. In some embodiments, the second and fourth time periods have the same length. In various embodiments, the first and third time periods are referred to as ultra slots, and the second and fourth time periods are referred to as beacon slots, and each beacon slot includes multiple symbol transmission time periods.

In some embodiments, beacon signals of the first type are transmitted using a tone having a fixed frequency relationship to the lowest tone in the frequency band in which said first type of beacon signal is transmitted, the frequency band in which the first type beacon signal is transmitted being a downlink frequency band. In various embodiments, the tone used to transmit the first type beacon signal also has a fixed frequency relationship to the tones in an uplink frequency band to be used for communicating information to the base station transmitting the said first type beacon signal. In some embodiments, the uplink and downlink frequency bands of a frequency band pair are disjoint and separated by one another by more than the spacing between the tones in said downlink frequency band.

In various embodiments, the first type of beacon signal has a fixed frequency relationship which is lower or higher than all other types of beacon signals transmitted in the frequency band into which the first type beacon signal is transmitted.

In some embodiments, transmitting at least one beacon signal within said first frequency band in each of said second time periods includes transmitting the first type of beacon signal at most once during said first time period and transmitting said second type of beacon signal at least twice during said first time period. In some embodiments, transmitting at least one beacon signal within said second frequency band in each of said fourth time periods includes transmitting the first type of beacon signal at most once during said third time period and transmitting said second type of beacon signal at least twice during said third time period.

In various embodiments, transmitting at least one beacon signal within said first frequency band in each of said second time periods includes transmitting a beacon of a third type at least once during said first time period and transmitting at least one beacon signal within said second frequency band in each of said fourth time periods includes transmitting a beacon signal of said third type at least once during said third time period.

In some embodiments, the first type of beacon is a carrier beacon signal used to communicate information about the carrier frequency used for downlink communications by the base station transmitting the carrier beacon signal. In various embodiments, the second type of beacon signal is cell type identifier beacon signal, sometimes referred to as a slope beacon, which communicates information identifying the cell from which the second type beacon signal is transmitted, and the third type of beacon signal, if included, is a sector type identifier beacon signal which provides information about a base station sector into which the base station transmitter which transmitted the third type beacon signal transmits.

In various embodiments, the first and second base station transmitters are not timing synchronized with each other, e.g., various embodiments in which the first and second base station transmitters are in different cell at different geographic locations. In many embodiments, the first base station transmitter is operated to repeat the transmissions of a plurality of beacon signals during a first time period during multiple sequential first periods of time, and the second base station transmitter is operated to repeat the transmissions of a plurality of beacon signals during a third time period during multiple sequential third periods of time, said first and third periods of time overlapping each other.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of the present invention are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal to determine a carrier frequency used by a base station which transmits beacon signals on a periodic basis within a frequency band corresponding to said carrier frequency, the method comprising:

monitoring a first frequency band for a first period of time to determine if a beacon signal is present in said first frequency band during at least a portion of said first period of time;

if said monitoring determines that a first beacon signal is present in said first frequency band during at least a portion of said first period of time, performing the additional steps of:

i) changing the monitored frequency band to a second frequency band, said second frequency band differing from said first frequency band by a frequency amount which is less than the width of said monitored frequency band, said frequency amount by which said monitored frequency band is changed being an amount which does not depend on an additional signal;

ii) monitoring the second frequency band to detect a second beacon signal; and iii) determining from at least the frequencies of the first and second detected beacon signals a carrier signal frequency which can be used by said wireless terminal to obtain a communication service from said base station.

2. The method of claim 1, wherein a frequency service band is associated with said carrier frequency and wherein said first monitored frequency band has the same frequency width as said frequency service band.

3. The method of claim 2, wherein said frequency service band is a downlink frequency band used to communicate downlink signals from said base station.

4. The method of claim 3, further comprising:

determining an uplink carrier frequency to use from information obtained by monitoring the determined downlink frequency band for uplink carrier frequency information.

5. The method of claim 2, where said determined carrier frequency is a downlink carrier frequency, the method further comprising:

determining an uplink carrier frequency to use from said determined downlink carrier frequency and stored information indicating an uplink carrier offset from said determined downlink carrier frequency.

6. The method of claim 1, wherein if a beacon is not detected within said first period of time, the method further includes:

changing said first monitored frequency band to a third monitored frequency band, the third monitored frequency band being different from the first monitored frequency band by an amount which is at most the width of said first monitored frequency band.

7. The method of claim 6, further comprising:

monitoring said third monitored frequency band for a second period of time to determine if a beacon signal is present in said third monitored frequency band during at least a portion of said second period of time.

8. The method of claim 7, further comprising:

if during said second period of time, said monitoring determines that a beacon signal is present in said third frequency band during at least a portion of said second period of time, performing the additional steps of:

i) changing the monitored frequency band by a frequency amount which is less than the width of said monitored frequency band;

ii) monitoring to detect a second beacon signal; and iii) determining from at least the frequency of the first and second detected beacon signals a carrier signal frequency which can be used by said wireless terminal to obtain a communication service from said base station.

9. The method of claim 6, wherein said beacon signals are of a plurality of different types, a first type of beacon signal being transmitted on a tone having a fixed frequency offset from the lowest tone in said frequency service band, said first type of beacon signal being transmitted using the lowest or highest tone of any beacon signal transmitted in said frequency service band, wherein the step i) of changing the monitored frequency band by a frequency amount which is less than the width of said monitored frequency band includes changing the monitored frequency band so that the monitored frequency band has the frequency of the detected beacon signal at a fixed preselected offset from the top of the monitored frequency band.

10. The method of claim 1, wherein said step of monitoring to detect a beacon signal includes detecting the energy of received signal tones.

11. The method of claim 10, wherein said step of monitoring to detect a beacon is performed prior to achieving symbol timing synchronization with a transmitter transmitting the detected beacon signals.

12. The method of claim 1,
wherein said second frequency band does not include some frequencies included in the first frequency band.

13. The method of claim 12, wherein said first and second frequency bands are the same size, and where the second frequency band includes a different center frequency than the first frequency band.

14. The method of claim 13,
wherein said beacon signal present in said first frequency band is located at a first frequency; and
wherein said second frequency band includes said first frequency.

15. The method of claim 1,
wherein said first frequency band is 1.25 MHz in width and has a first center frequency; and
wherein changing the frequency band being monitored includes changing the frequency band being monitored from the first frequency band to a second frequency band which is 1.25 MHz in width and has a second center frequency which is less than 1.25 MHz from the first center frequency.

16. The method of claim 1, wherein said frequency amount by which the monitored frequency band is changed is a function of the frequency location of the beacon signal in the first frequency band.

17. The method of claim 1,
wherein determining from at least the frequencies of the first and second detected beacon signals includes:
identifying one of the first and second beacons as a carrier beacon; and
determining the carrier signal frequency from a known frequency offset from the frequency of the one of the first and second beacon signals identified as the carrier beacon signal, said carrier signal frequency being different from the frequency of the one of the first and second beacon signals identified as the carrier beacon signal.

18. A wireless terminal, comprising:
   means for monitoring at the wireless terminal a first frequency band for a first period of time to determine if a beacon signal is present in said first frequency band during at least a portion of said first period of time; and
   means for performing at the wireless terminal, if said monitoring determines that a first beacon signal is present in said first frequency band during at least a portion of said first period of time, the additional steps of:
      i) changing the monitored frequency band to a second frequency band, said second frequency band differing from said first frequency band by a frequency amount which is less than the width of said monitored frequency band, said frequency amount by which said monitored frequency band is changed being an amount which does not depend on an additional signal;
      ii) monitoring the second frequency band to detect a second beacon signal; and
      iii) determining from at least the frequency of the first and second detected beacon signals a carrier signal frequency which can be used by said wireless terminal to obtain a communication service from said base station
   wherein said wireless terminal is adapted for use in a system including a base station which transmits beacon signals on a periodic basis within a frequency band.

19. The wireless terminal of claim 18, wherein a frequency service band is associated with said carrier frequency and wherein said monitored signal band has the same frequency width as said frequency service band.

20. The wireless terminal of claim 19, wherein said frequency service band is a downlink frequency band used to communicate downlink signals from said base station.

21. The wireless terminal of claim 18, wherein the wireless terminal further includes means for performing, if a beacon is not detected within said first period of time, the additional step of:
   changing said monitored frequency band to a third monitored frequency band, the third monitored frequency band being different from the first monitored frequency band by an amount which is at most the width of said monitored frequency band.

22. The wireless terminal of claim 21, further comprising:
   means for monitoring said third monitored frequency band for a second period of time to determine if a beacon signal is present in said third monitored frequency band during at least a portion of said second period of time.

23. The wireless terminal of claim 22, further comprising:
   means for performing, if during said second period of time said monitoring indicates the present of a beacon signal detected by said monitoring, the further steps of:
      i) changing the monitored frequency band by a frequency amount which is less than the width of said monitored frequency band;
      ii) monitoring to detect a second beacon signal; and
      iii) determining from at least the frequency of the first and second detected beacon signals a carrier signal frequency which can be used by said wireless terminal to obtain a communication service from said base station.

24. The wireless terminal of claim 18, wherein said carrier frequency is a downlink carrier frequency, said wireless terminal further comprising:
   stored information indicating a frequency offset from said downlink carrier frequency where an uplink carrier frequency is located.

25. A wireless terminal for use in a system including a base station which transmits beacon signals on a periodic basis within a frequency band, the wireless terminal comprising:
   a receiver;
   a beacon monitoring module for monitoring a first frequency band for a first period of time to determine if a beacon signal is present in said first frequency band during at least a portion of said first period of time; and
   a monitoring band adjustment module for changing the monitored frequency band to a second frequency band, said second frequency band differing from said first frequency band by a frequency amount which is less than the width of said monitored frequency band, following detection of a first beacon signal by said beacon monitoring module during said first period of time, said frequency amount by which said monitored frequency band is changed being an amount which does not depend on an additional signal;
   wherein said beacon monitoring module is configured to monitor the second frequency band to detect a second beacon signal following a change in the monitored frequency band; and
   a carrier detection module for determining from at least the frequency of the first and second detected beacon signals a carrier signal frequency which can be used by said wireless terminal to obtain a communication service from said base station.

26. The wireless terminal of claim 25, wherein a frequency service band is associated with said carrier frequency and wherein said monitored signal band has the same frequency width as said frequency service band.

27. The wireless terminal of claim 26, wherein said frequency service band is a downlink frequency band used to communicate downlink signals from said base station.

28. A physical computer readable medium embodying computer executable instructions for use in a wireless terminal, said wireless terminal being in a system including a base station which transmits beacon signals on a periodic basis within a frequency band, said computer readable medium comprising:
   instructions for causing a computer to monitor a first frequency band for a first period of time to determine if a beacon signal is present in said first frequency band during at least a portion of said first period of time; and
   instructions for causing the computer to perform, if said monitoring determines that a first beacon signal is present in said first frequency band during at least a portion of said first period of time, the additional steps of:
      i) changing the monitored frequency band to a second frequency band, said second frequency band differing from said first frequency band by a frequency amount which is less than the width of said monitored frequency band, said frequency amount by which said monitored frequency band is changed being an amount which does not depend on an additional signal;
      ii) monitoring the second frequency band to detect a second beacon signal; and
      iii) determining from at least the frequency of the first and second detected beacon signals a carrier signal frequency which can be used by said wireless terminal to obtain a communication service from said base station.

* * * * *

UNITED STATES PATENT AND TRADEMARK OFFICE
CERTIFICATE OF CORRECTION

PATENT NO. : 7,859,986 B2
APPLICATION NO. : 11/153767
DATED : December 28, 2010
INVENTOR(S) : Laroia et al.

It is certified that error appears in the above-identified patent and that said Letters Patent is hereby corrected as shown below:

Column 29, line 23, claim 18: "said base station" to read as --a base station--

Signed and Sealed this
Thirtieth Day of August, 2011

David J. Kappos
*Director of the United States Patent and Trademark Office*